(12) United States Patent
Sikes

(10) Patent No.: US 6,825,313 B2
(45) Date of Patent: Nov. 30, 2004

(54) COPOLYMERS OF AMINO ACIDS AND METHODS OF THEIR PRODUCTION

(75) Inventor: C. Steven Sikes, Eugene, OH (US)

(73) Assignee: Aquero Company, Eugene, OR (US)

(*) Notice: Subject to any disclaimer, the term of this patent is extended or adjusted under 35 U.S.C. 154(b) by 0 days.

(21) Appl. No.: 10/431,124

(22) Filed: May 7, 2003

(65) Prior Publication Data

US 2004/0006198 A1 Jan. 8, 2004

Related U.S. Application Data

(60) Provisional application No. 60/378,915, filed on May 7, 2002.

(51) Int. Cl.[7] ............................................. C08G 73/10
(52) U.S. Cl. ...................... 528/322; 528/310; 528/328; 528/489; 525/419; 525/420; 525/422
(58) Field of Search ................................. 528/322, 310, 528/328, 489; 525/419, 420, 422

(56) References Cited

U.S. PATENT DOCUMENTS

| | | |
|---|---|---|
| 5,478,919 A | 12/1995 | Koskan et al. |
| 5,493,004 A | 2/1996 | Groth et al. |
| 5,548,036 A | 8/1996 | Kroner et al. |
| 5,594,077 A | 1/1997 | Groth et al. |
| 5,639,832 A | 6/1997 | Kroner et al. |
| 5,714,558 A | 2/1998 | Groth et al. |
| 5,981,691 A | 11/1999 | Sikes |
| 6,054,553 A | 4/2000 | Groth et al. |
| 6,063,961 A | 5/2000 | Kroner |
| 6,495,658 B2 | 12/2002 | Sikes et al. |

OTHER PUBLICATIONS

Copy of International Search Report in Application No. PCT/US03/14312.

*Primary Examiner*—Duc Truong
(74) *Attorney, Agent, or Firm*—LeeAnn Gorthey; Perkins Coie LLP

(57) ABSTRACT

Disclosed are copolymers based on aspartic acid or its precursor molecules and methods of their production. The copolymers are water-soluble over a wide range of composition and molecular weight. Their preparation involves conversion of a polysuccinimide to copolymers of defined composition, containing aspartate and succinimide residues and/or residues of asparagine. In particular, the copolymers include water-soluble terpolymers of aspartate, asparagine, and succinimide.

29 Claims, 8 Drawing Sheets solute of the copolymer of asparagine and ammonium aspartate salt of the copolymer of asparagine with ammonium aspartate or aspartic acid terpolymer of asparagine and succinimide with ammonium aspartate or aspartic acid

COPOLYMERS OF AMINO ACIDS AND METHODS OF THEIR PRODUCTION

This application claims priority to U.S. Provisional Application Ser. No. 60/378,915, filed May 7, 2002, which is hereby incorporated by reference in its entirety.

FIELD OF THE INVENTION

The present invention relates to aspartate copolymers of defined composition and methods of their production from polysuccinimide. More particularly, the invention relates to water-soluble aspartate/succinimide and aspartate/asparagine copolymers and to water-soluble terpolymers of aspartate, asparagine, and succinimide.

REFERENCES

Bhattacharyya, D., L. G. Bachas, L. Cullen, J. A. Hestekin, and S. K. Sikdar. 2000. Membrane-based sorbent for heavy metal sequestration. U.S. Pat. No. 6,139,742.

Berglund, K. A., H. Alizadeh, and D. D. Dunuwila. 2001. Deicing compositions and methods of use. U.S. Pat. No. 6,287,480.

Bichon, D., P. Bussat, and M. Schneider. 2001. Gas or air filled polymeric microballoons. U.S. Pat. No. 6,200,548.

Calton, G. J. and J. B. Cook. 2000. Stain removing composition. U.S. Pat. No. 6,068,665.

Cami, P., D. Lecomte, A. Eyal, and A. Vitner. 2001. Process for preparing aspartic acid from ammonium aspartate, and continuous process for preparing polysuccinimide involving such process. U.S. Pat. No. 6,274,698.

Dontsova, K. and L. D. Norton. 2001. Effects of exchangeable Ca:Mg ratio on soil clay flocculation, infiltration, and erosion. In, Sustaining the Global Farm, D. E. Stott, R. H. Mohtar, and G. C. Steinhardt, eds. $10^{th}$ International Soil Conservation Organization Meeting, Purdue University, W. Lafayette, Ind. p. 580–585.

Dorshow, R. B., S. Achilefu, R. Rajagopolan, J. E. Bugaj. 2001. Method of measuring physiological function. U.S. Pat. No. 6,228,344.

Engel, J., W. Deger, T. Reissmann, G. Losse, W. Naumann, and S. Murgas. 2000. Process for the preparation and activity-stabilized complexes of LHRH antagonists. U.S. Pat. No. 6,054,555.

Eyal, A., R. J. Jansen, A. Vitner, P. Cami, E. Mailly, T. Chattaway, B. Jarry, and J. More. 2002. Process for the production of aspartic acid condensate. U.S. Pat. No. 6,344,348.

Fong, D. W. 1987. Process of making N-(2-hydroxy-3-sulfopropyl) amide containing polymers. 1987. U.S. Pat. No. 4,703,092.

Fong, D. W. 1991. Scaling salt threshold inhibition and dispersion with hydrophilic/hydrophobic polymers. U.S. Pat. No. 5,035,806.

Gerlach, M. and B. Lehmann. 2001. Cleaning method using a mixture containing wood chippings and, optionally, polyaspartic acid and/or a derivative of polyaspartic acid. U.S. Pat. No. 6,231,680.

Gerlach, M., B. Lehmann, H. Wendt, H. Emde, and U. Recht. 2001. Use of polyaspartic acids in cleaner formulations with abrasive action. U.S. Pat. No. 6,245,157.

Gonzalez-Blanco, J., W. Hoheisel, P. R. Nyssen, and D. Pf ützenreuter. 2000. Ink-jet inks containing nanometer-size inorganic pigments. U.S. Pat. No. 6,110,266.

Groth, T., W. Joentgen, D. Jovcic, P. Wagner, and H-J. Traenckner. 1996. Process for the preparation of polysuccinimide. U.S. Pat. No. 5,493,004.

Groth, T., W. Joentgen, P. Wagner, H-J. Traenckner, and D. Jovcic. 1997. Process for preparing polymers which contain aspartic acid. U.S. Pat. No. 5,594,077.

Groth, T., W. Joentgen, P., and N. Müller. 1998. Process for preparing polyaspartic acid. U.S. Pat. No. 5,714,558.

Groth, T., W. Joentgen, F. Dobert, K-P. Heise, T. Menzel, U. Pentling, H-G. Pirkl, P. Wagner, and J. Weinschenck. 2000. Process for the preparation of polymers having recurring agents. U.S. Pat. No. 6,054,553.

Guth, J. J., S. A. Vona, J. S. Thomaides, and A. C. Savoca. 2000. Catalyzed water-soluble/dispersible reactive derivatives of polyimido compounds for modifying proteinaceous substrates. International Pubn. No. WO 00/59458.

Guth, J. J., S. A. Vona, Jr., J. S. Thomaides, D. Howard, P. M. Petersen, and C. Iovine. 2001. Use of water-soluble/dispersible reactive functionalized derivatives of polyimido compounds for modifying proteinaceous substrates. U.S. Pat. No. 6,303,794.

Guth, J. J., N. S. Lad, C. Iovine, and M. Blumenthal. 2001. Use of polyamino acid salts in water-borne adhesive applications. U.S. Pat. No. 6,174,988.

Hallam, M., G. T. Shouldice, and J. J. Guth. 2000. Use of derivatives of polyamino acids as emulsifiers stabilizers in aqueous free radical emulsion polymerization. U.S. Pat. No. 6,143,817.

Harada, Y., H. Shinoda, M. Sukegawa, and H. Tamatani. 1997. Polyaspartic acid zwitterionic derivatives, preparation processes thereof, hair-treating compositions and cosmetic compositions. U.S. Pat. No. 5,686,066.

Jordan, G. T. and E. P. Gosselink. 2003. Polyaspartate derivatives for use in detergent compositions. International Pubn. No. WO 03/014193.

Klein, T., J. Voss, H. Schmidt, F. Ebert, H-G. Muller. 2002. Thixotropic dispersions of polysuccinimide and their use. U.S. patent application Ser. No. 2002/0193279.

Koskan, L. P. and A. R. Y. Meah. 1993. Production of high molecular weight polysuccinimide and high molecular weight polyaspartic acid from maleic anhydride and ammonia. U.S. Pat. No. 5,219,952.

Kroner, M., H. Hartmann, G. Shomick, R. Baur, B. Potthoff-Karl, V. Schwendemann, and A. Kud. 1996. Preparation of polymers of aspartic acid and their use. U.S. Pat. No. 5,548,036.

Kroner, M., G. Shomick, D. Boeckh, R. Baur, B. Potthoff-Karl, V. Schendemann, C. Schade, and A. Kud. 1997. Preparation of products of the reaction of polyaspartimide and amino acids and the use thereof. U.S. Pat. No. 5,639,832.

Kroner, M. 2000. Process for preparing cocondensates of aspartic acid amines. U.S. Pat. No. 6,063,961.

Kubota, H., S. Kosako, K. Nakao, N. Naito, T. Uemura, and M. Yamamoto. 2001. Macromolecular dispersion type liquid crystal display element and method of manufacturing the same. U.S. Pat. No. 6,221,443.

Lentz, R. D., R. E. Sojka, and D. L. Carter. 1993. Influence of polymer charge type and density on polyacrylamide ameliorated furrow erosion. Proceedings of the $24^{th}$ Annual International Erosion Control Association Conference. pgs. 161–168.

Lentz, R. D., R. E. Sojka, and C. W. Robbins. 1998. Reducing phosphorus losses from surface-irrigated fields: emerging polyacrylamide technology. J. Environmental Quality 27, 305–312.

Li, C., S. Wallace, D-F. Yu, and D. J. Yang. 2001. Water soluble paclitaxel prodrugs. U.S. Pat. No. 6,262,107.

Ma, Z. 2002. Process for production of polyasparagine and the high nitrogen content polymer formed thereby. U.S. Pat. No. 6,365,706.

March, J. 1992. Advanced organic chemistry, reactions, mechanisms, and structure. John Wiley & Sons, New York. Chapter 10, Aliphatic nucleophilic substitution, pgs. 293–362.

Martin, D. A. 1999. Production of solid polyaspartate salt. U.S. Pat. No. 5,859,149.

Masaya, Y., Y. Akio, and M. Akio. 2000. Composition for hair spray. JP 2000191475.

Matsubara et al., *Polymer Preprints* 37(1), 699–700, ACS Spring Meeting, 1996.

Matsubara et al., *Macromolecules* 30(8), 2305–2312, 1997.

Mazo, G. Y., R. J. Ross, J. F. Kneller, and J. Mazo. 2001. Production of succinimide copolymers in cyclic carbonate solvent. U.S. Pat. No. 6,197,897.

Mukouyama, M. and S. Yasuda. 2001. Methods for producing a succinimide polymer, an aspartic acid polymer and L-aspartic acid. U.S. Pat. No. 6,300,105.

Mukouyama, M. and S. Yasuda. 2002. Polyaspartic acid. U.S. Pat. No. 6,380,351.

Müller, H. P., D. Hackenmüller-Bruns, H. Gruttmann, and K. Heeschen. 2001. Active-substance-containing moulded bodies based on biodegradable thermoplastically processable polymers. U.S. Pat. No. 6,239,192.

Namba, T., Y. Fujii, T. Saeki, and H. Kobayashi. 2001. Clathrate hydrate inhibitor and method of inhibiting the formation of clathrate hydrates using it. U.S. Pat. No. 6,232,273.

Naoyuki, K., A. Toranosuke, and Y. Masato. 2000. CMP abrasive and polishing of substrate. JP 2000109799.

Orts, W. J., R. E. Sojka, G. M. Glenn, and R. A. Gross. 2001. Biopolymer additives for the reduction of soil erosion losses during irrigation. In, Biopolymers from polysaccharides and agroproteins, R. A. Gross and C. Scholz, eds. ACS Symposium Series 786, American Chemical Society, Washington D.C. pp. 102–116.

Reddy, B. R. 2002. Methods of cementing in subterranean zones. U.S. Pat. No. 6,419,016.

Shinoda, H., Y. Asou, and H. Tamatani. 2002. Sustained releasing drug comprising copolymers and process for preparing the same. U.S. Pat. No. 6,419,951.

Sicius, H., T. Sildatke, T. Menzel, W. Wambach, W. Joentgen, T. Klausa, and T. Klein. 2002. U.S. patent application Ser. No. 2002/0125199.

Sikes, C. S. 1999. Imide-free and mixed amide/imide synthesis of polyaspartate. U.S. Pat. No. 5,981,691.

Sikes, C. S., G. Swift, and L. Ringsdorf. 2002. Comonomer compositions for production of imide-containing polyamino acids. U.S. Pat. No. 6,495,658.

Sojka, R. E. and R. D. Lentz. 1997. A PAM primer: a brief history of PAM and PAM-related issues. USDA Agricultural Research Services. Northwest Irrigation and Soils Research Laboratory. pgs. 1–18.

Sojka, R. E., R. D. Lentz, I. Shainberg, T. J. Trout, C. W. Ross, C. W. Robbins, J. A. Entry, J. K. Aase, D. L. Bjomeberg, W. J. Orts, D. T. Westermann, D. W. Morishita, M. E. Watwood, T. L. Spofford, and F. W. Barvenik. 2000. Irrigating with polyacrylamide (PAM)—nine years and a million acres of experience. In, Proceedings of the National Irrigation Symposium, R. G. Evans, B. L. Benham, and T. P. Trooien, eds. American Society of Agricultural Engineers, 4$^{th}$ Decennial Symposium, St. Joseph, Mich. pgs. 161–169.

Tang, J. 2001. Biodegradable poly(amino acid)s, derivatized amino acid polymers and methods for making same. U.S. Pat. No. 6,184,336.

Träubel, H., H-P. Müller, H. Reiff, J. Reiners, G-F. Renner, R. Koch, and K. Pisaric. 2001. Biologically degradable leather. U.S. Pat. No. 6,254,644.

Vicari, R., O. S. Fruchey, K. N. Juneau, S. F. Thames, and J. W. Rawlins. 2000. Reactive hyperbranched polymers for powder coatings. U.S. Pat. No. 6,114,489.

Wagner, P., F. Döbert, T. Menzel, T. Groth, W. Joentgen, U. liesenfelder, J. Weinschenck, and K-P Heise. 2001. Method for carrying out polycondensation reactions. U.S. Pat. No. 6,187,898.

Wang, Y. 2000. Direct polyaspartate synthesizing process catalyzed by aspartic acid precursor. CN 1267673.

Wolk, S. K., G. Swift, Y. H. Paik, K. M. Yocom, R. L. Smith, and E. S. Simon. 1994. One- and two-dimensional nuclear magnetic resonance characterization of poly (aspartic acid) prepared by thermal polymerization of L-aspartic acid. *Macromolecules* 27:7613–7620.

Workman, D. P., K. M. Bailey, and K. J. Moeggenborg. 2000. Cross-linked polyimide binders for ceramics manufacture. U.S. Pat. No. 6,075,082.

Yashuda, S., M. Mukoyama, and T. Matsuda. 2002. Succinimide-based polymer-coated particle and method for producing same. JP 2002191206.

Zarges, W., T. Groth, W. Joentgen, and A. Groschl. 2001. Inhibition and delay of deposit formation in membrane processes. U.S. Pat. No. 6,187,195.

BACKGROUND OF THE INVENTION

Polymerization of aspartic acid and aspartic-acid precursors, such as maleic acid plus ammonia, to produce first polysuccinimide, then polyaspartate by mild alkaline hydrolysis of the imide rings, has been the subject of commercial research and development for more than two decades. Much of this effort is summarized in U.S. Pat. Nos. 5,981,691 and 6,495,658 to Sikes and coworkers (1999, 2002).

These polyanionic polymers have the advantages of ready biodegradability and good biocompatibility. Although research and development of polysuccinimide and polyaspartate on a large scale has occurred in numerous companies over this interval, successful commercialization of the molecules has been limited by technical difficulties of several kinds.

Bayer Company has used the maleic-plus-ammonia route to produce molecules of low molecular weight (approximately 2000 to 3000 Da). In addition, these molecules are branched rather than linear in morphology, which tends to hinder environmental degradability. These molecules have been introduced into a number of products, including detergents, in which the polyaspartates provide dispersancy and protection against redeposition of mineral deposits.

The maleic-plus-ammonia route, however, is not extendable beyond the range of low molecular weights. This problem, plus the branched morphology of the polymer products, tends to limit the utility and performance of these molecules in many markets.

Other companies, for example Rohm and Haas, Solutia, and Donlar Corporation, have focused on polymerization of aspartic acid itself. The dry thermal polymerization of aspartic acid results first in polysuccinimides, then polyaspartates following ring-opening via mild alkaline treatment, that are somewhat larger in size (molecular weights around 3,000 to 5,000), and also less branched, than those described above. Donlar introduced this type of polyaspartate in some detergent markets and also in an oilfield application, and has made an effort to introduce the polyaspartate into agricultural markets as a soil additive and growth enhancer.

Mukouyama, in U.S. Pat. No. 6,380,350 (2002), teaches the polymerization of aspartic acid in water via heat and pressure in an autoclave. The product is polyaspartic acid, obtained directly, without production of the intermediate polysuccinimide. Reasonably high yields of low Mw (2 to 6.5 kDa) polyaspartic acids were reported.

Many if not most markets often require larger molecules, in numerous cases much larger molecules, ranging from 10,000 to 100,000 or more in molecular weight. The principal approach to this issue has been the use of acid catalysis, typically phosphoric acid or polyphosphoric acid, at up to 30% or higher by weight of the aspartic acid monomer, as an agent that promotes rapid polymerization. In this approach, the polymers attain a larger size before chain-lengthening is terminated. Such termination is generally due to thermal decomposition of the amino termini, which are entirely absent in thermally produced polyaspartates upon completion of chain lengthening.

Molecules in the range of 30,000 Da and somewhat higher are achievable via acid catalysis. An added benefit of this approach is that color formation tends to be suppressed under these conditions, resulting in polymers of favorable, light tan to off-white color. However, the use and subsequent removal of the acid catalyst adds significantly to cost.

Attempts to produce copolymers of aspartate and succinimide by substoichiometric, mild-alkaline ring-opening of the imide residues of polysuccinimide were unsuccessful (Wolk et al., 1994). Treatment of an aqueous slurry of polysuccinimide particles residues with NaOH, for example, produced a soluble phase containing fully ring-opened polyaspartate and an insoluble phase of succinimide polymer. The alkaline attack appeared to bring the surficial polysuccinimide molecules into solution, where they rapidly became fully ring-opened, leaving a residual particle of insoluble polysuccinimide. There was essentially no evidence of copolymer produced via this approach.

Use of animonium hydroxide for ring-opening of polysuccinimide was reported by Koskan and Meah in U.S. Pat. No. 5,219,952; however, only polyaspartate was described as the product. When a large excess of liquid ammonia under pressure was used for ring-opening of polysuccinimide, a homopolymer of asparagine was produced (Ma, 2002; U.S. Pat. No. 6,365,706).

Copolymers of aspartic acid and succinimide containing undefined levels of asparagine residues have been described as reaction products of the maleic-plus-ammonia route to low Mw, branched polysuccinimides, resulting from the use of large excesses of ammonia. In addition, when the temperatures of polymerization were too low or reaction conditions were otherwise insufficient (e.g., too short an interval of heating) to completely effect the ring-closure of succinimide residues, aspartic acid residues were reported to occur in the product copolymers. (See e.g. Groth et al., U.S. Pat. Nos. 5,493,004, 5,594,077, 5,714,558, and 6,054,553; Kroner et al., U.S. Pat. Nos. 5,548,036 and 5,639,832.) These reports describe copolymers produced as undesired and undefined side products, rather than the defined aspartate-asparagine-succinimide copolymers disclosed herein.

Derivatization

Another useful feature of polysuccinimides is the reactivity of the imide rings to derivatization. Nucleophiles, such as amino compounds, readily form covalent linkages to the polymer backbone via amide bond formation at the carbonyl carbon, by attacking the imide linkage to the imide nitrogen. However, due to the low water solubility and wettability of these compounds, most efforts to produce derivatives of polyaspartate via this route (i.e. derivatization of polysuccinimide, followed by alkaline ring-opening of unreacted succinimide residues) have been conducted in organic solvents such as dimethyl formamide and dichloromethane, in which the polysuccinimide and usually the nucleophilic additive are both soluble. Use of such solvents is costly and also militates against use of the products in many markets, for example personal-care and biomedical markets, in which even traces of organic solvents are not allowable. For these reasons, as well as the reasons already cited regarding the homopolymers themselves, derivatives of the polysuccinimides and polyaspartates have not found marketable applications to date.

Attempts have been made to functionalize polysuccinimide in water via nucleophilic addition of amino compounds to an aqueous slurry of polysuccinimide. As the nucleophile adds to the polyimide, the latter is gradually solubilized, and can then be further functionalized much more readily in water. The problems with this approach include production of heterogeneous molecules (surficial polysuccinimides of the polysuccinimide particles tend to become over-derivatized, the others under-derivatized), plus the overall slowness and inefficiency of the process. Consequently, most of these approaches have not been pursued.

First-generation, Water-soluble Copolyimides of Amino Acids

Copolymers of aspartate and succinimide were disclosed by Sikes and coworkers (1999, U.S. Pat. No. 5,981,691; U.S. Pat. No. 6,495,658; both incorporated herein by reference). In these approaches, copolymers were produced via thermal copolymerization of aspartic acid and sodium aspartate, leading directly to imide-containing copolymers, and obviating the intermediate production of polysuccinimide. The copolymers are highly water-soluble and thus readily derivatized via nucleophilic addition in water, enabling economic production of high-performance derivatives having favorable environmental profiles.

However, several inherent problems remained. For example, synthesis of the copolymers by this method results in significantly branched, low-molecular-weight, moderately-to-highly colored (light tan to dark reddish) products. The only methods disclosed for achieving somewhat higher Mw were inclusion of crosslinking and chain-extending comonomers, such as lysine, and inclusion of a preformed polyaspartate in the polymerizing mixture of comonomeric aspartic acid and sodium aspartate.

In addition, the disclosed synthetic processes require the pH and ionic content of the reactant solutions, prior to thermal polycondensation, to be controlled within narrow limits. This restriction prevents utilization of strategies such as acid catalysis to promote production of higher molecular weight forms of polysuccinimide and polyaspartate. Acid catalysis also provides the advantage of producing polysuccinimides of light color (light tan to cream-colored), as mentioned above.

Accordingly, currently available methods of producing water soluble aspartate-succinimide copolymers enable the production of only low Mw, branched forms of the copolymers.

SUMMARY OF THE INVENTION

In one aspect, the invention provides an aspartate-containing copolymer comprising monomer residues selected from (a) aspartate residues, which may be substituted at the side chain carboxyl, (b) asparagine residues, which may be substituted at the side chain nitrogen, and (c) succinimide residues. The copolymer comprises residue (a) and at least one type of residue selected from (b) and (c), and is characterized by:

(i) a molecular weight greater than 5000 Daltons, or (ii) a substantially linear morphology and a molecular weight greater than 600 Daltons, or (iii) water solubility and a molecular weight greater than 2000 Daltons, or any combination thereof.

In one embodiment, the copolymer has a molecular weight up to about 100,000 Daltons. Preferably, the copolymer is water soluble and has a molecular weight of about 5000 to about 100,000 Daltons. In one embodiment, such a copolymer also has a substantially linear morphology.

In other embodiments, the copolymer has a linear morphology and a molecular weight of about 5000 to about 100,000 Daltons, or about 30,000 to about 100,000 Daltons. In still further embodiments, the copolymer has a branched morphology and a molecular weight of about 5000 to about 100,000 Daltons, or about 30,000 to about 100,000 Daltons.

In the subject copolymers, the above-referenced aspartate, asparagine, and succinimide residues may comprise, for example, about 5 to 95 mole percent aspartate, 0 to about 80 mole percent asparagine, and 0 to about 95 mole percent, more preferably about 5 to 95 mole percent, succinimide (although the mole percentages of asparagine and succinimide are not simultaneously zero). In further embodiments, the copolymers comprise about 30 to 50 mole percent aspartate, 0 to about 5 mole percent asparagine, and about 45 to 65 mole percent succinimide. In additional embodiments, the copolymers comprise about 5 to 95 mole percent aspartate, about 5 to 95 mole percent asparagine, and 0 to about 60 mole percent succinimide.

In one embodiment, the copolymers have no (zero mole percent) asparagine residues. In another embodiment, the copolymers have no (zero mole percent) succinimide residues.

Preferably, at least 50 mole % of the copolymer consists of monomer residues selected from the above-referenced aspartate, asparagine, and succinimide residues. These residues may also make up, for example, 60%, 70%, 80%, 90%, or greater than 95 mole % of the copolymer. Other monomer residues which may be included in the copolymer, at levels of up to about 50 mole %, include, for example, residues derived from other amino acids, dicarboxylic acids, tricarboxylic acids, alkyl amines, alkyl diamines, alkyl polyamines, amino sugars, and amino saccharides.

In one embodiment, the asparagine residues are unsubstituted; in other embodiments, one or more asparagine residues are substituted at the side chain nitrogen, e.g. with a group independently selected from sulfonate, phosphonate, siloxane, saccharide, polyoxyalkylene, fatty alkyl, fatty alkenyl, and fatty acyl.

In another embodiment, the aspartate residues are unsubstituted and are in neutralized (acid) form, or they have a metal counterion, preferably selected from sodium, potassium, calcium, magnesium, zinc, aluminum, iron, barium, copper, molybdenum, nickel, cobalt, and manganese. In one embodiment, the counterion is sodium. In other embodiments, one or more aspartate residues is substituted at the side chain carboxyl group, e.g. as an ester or amide.

In a related aspect, the invention provides a method of synthesizing an aspartate copolymer, the method comprising:

(a) adding to an aqueous slurry of a polysuccinimide, at a pH of about 8–12, a reagent selected from (i) ammonium hydroxide and (ii) a mixture of ammonium hydroxide and a metal hydroxide, effective to produce a product copolymer containing aspartate and asparagine residues; and (b) drying the product copolymer under non-hydrolytic conditions.

When the product copolymer contains ammonium aspartate residues, drying step (b) is effective to convert at least a portion, and in some cases all, of these ammonium aspartate residues to aspartic acid residues.

To form a copolymer containing succinimide residues, the method further comprises the step of (c) heating the product copolymer from (b), effective to convert at least a portion, and in some cases all, of the aspartic acid residues to succinimide residues.

Generally, a pH of about 9–11 is used in step (a), and the metal hydroxide, when present, is typically sodium hydroxide. Conditions of the drying of step (b) preferably include a temperature less than about 90° C. Heating step (c) is generally carried out at about 160–350° C., e.g. about 180–220° C.

In a further embodiment of the method, a solution of the copolymer formed from polysuccinimide via the mild alkaline ring-opening (a) is adjusted to a pH in the range of 2 to 6.5 by addition of an acid. The pH-adjusted copolymer solution is then (b) dried, preferably under non-hydrolytic conditions, to remove water, then (c) heated to convert at least some, and in some cases all, ammonium aspartate and aspartic acid residues to succinimide residues. This procedure, comprising the pH adjustment step, is effective to produce copolymers having generally higher levels of succinimide and lower levels of aspartate residues than procedures not employing this step.

The invention also provides methods for production of copolymers of aspartic acid and succinimide from preformed polyaspartic acids or polyaspartates. Solutions of these polymers are adjusted to a pH of 2 to 6.5, dried, preferably non-hydrolytically, then heated to effect ring-closure of aspartic acid residues. Anionic aspartate residues, having nonvolatile cationic counterions, such as sodium, are blocked from ring-closure and thus remain as anionic aspartate residues. Alternatively, a solution of a polyaspartate polymer having a cationic non-hydrogen counterion, such as sodium polyaspartate, is treated to replace the counterion with hydrogen, by dialysis or ion exchange, and the resulting solution is lyophilized.

The invention also includes, in some embodiments, derivatizing the copolymer obtained after heating step (c), by reaction of one or more derivatizing reagents at succinimide carbonyl groups, asparagine amine side groups, aspartate carboxyl side groups, or a combination thereof. In a preferred embodiment, this derivatizing can be carried out in an aqueous environment.

The product copolymers and derivatives thereof have many practical uses, and can be further derivatized and/or incorporated into various products, as discussed further below. Accordingly, the invention also encompasses the use of an aspartate copolymer as disclosed above, comprising (a) aspartate residues, which may be substituted at the side chain carboxyl, and at least one residue selected from (b) asparagine residues, which may be substituted at the side chain nitrogen, and (c) succinimide residues, and characterized by (i) a molecular weight greater than 5000 Daltons, or (ii) a substantially linear morphology and a molecular weight greater than 600 Daltons, or (iii) water solubility and a molecular weight greater than 2000 Daltons, or any combination thereof, in the production of such a product, particularly a product selected from: a flocculating agent, a soil retention agent, a biodegradable packaging, an enzyme stabilizer, a crosslinker for powder coatings, an additive for use in removable coatings, and an additive for use in composites (e.g. minerals/fibers with organic binders).

For example, useful derivatives include the products of conjugating an imide-containing copolymer of the invention with a polymeric hydroxyl-containing compound, selected from e.g. starch, pullulan, cellulosics, polyglycols, polyalcohols, and gum polysaccharides. The products may be used, for example, as clarifying agents in water treatment and sewage treatment, or as soil retention and water conservation agents in agriculture.

These and other objects and features of the invention will become more fully apparent when the following detailed description of the invention is studied in conjunction with the accompanying drawings.

DETAILED DESCRIPTION OF THE INVENTION

I. Definitions

Figure 1:
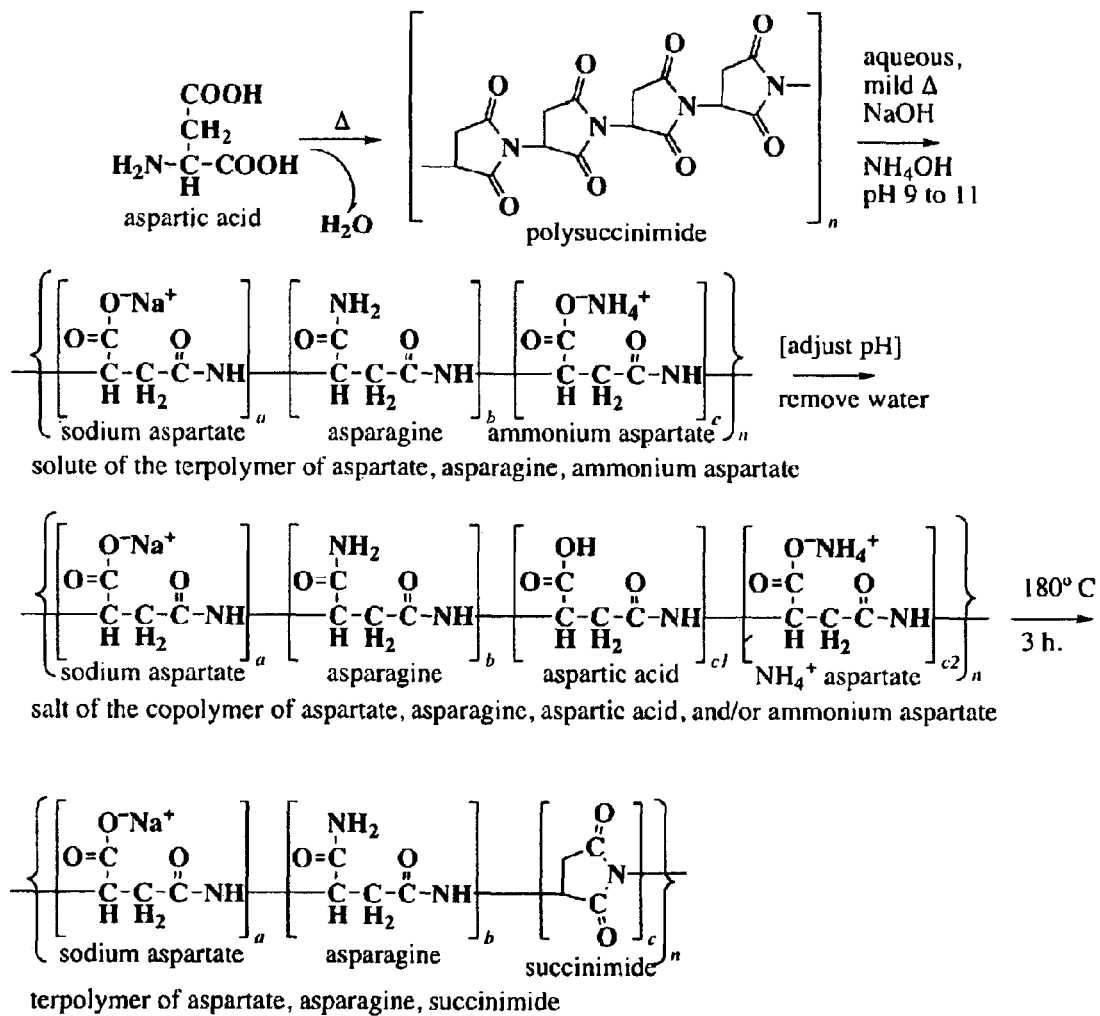
FIG. 1 is a reaction scheme showing the preparation of aspartate-asparagine-succinimide copolymers, in accordance with selected embodiments of the invention, employing a metal hydroxide and ammonium hydroxide for ring opening, with an optional pH adjustment step.

The terms below, as used herein, have the following definitions, unless indicated otherwise:

"Molecular weight" of a polymer refers to weight average molecular weight as determined by gel permeation chromatography (GPC), preferably using commercial polyaspartate polymers as standards.

"Substantially linear" with reference to a polymer backbone indicates that the backbone has at most one branch point per six monomer residues, preferably at most one per 12 residues, and more preferably at most one per 20 residues, generally on a random basis.

"Water soluble" indicates that a copolymer is greater than 95%, and preferably greater than 99%, soluble in water at room temperature.

An "aspartate residue", as used herein, includes backbone residues of the form —CH(COOR)—$CH_2$—(C=O)—NH— or —CH($CH_2$COOR)—(C=O)—NH— (β and α forms, respectively), where R is hydrogen, a cationic counterion, or, in derivatized copolymers, a substituent. The term thus includes aspartic acid residues as well as metal or ammonium aspartate residues.

An "aspartate/succinimide copolymer", as defined herein, contains residues of aspartate and succinimide, may also contain residues of asparagine, and may further contain up to 50 mole %, preferably up to 10 mole %, other monomer residues. Similarly, an "aspartate/asparagine copolymer", as defined herein, contains residues of aspartate and asparagine, may also contain residues of succinimide, and may further contain up to 50 mole %, preferably up to 10 mole %, other monomer residues. Both of these terms are encompassed by the term "aspartate copolymer" or "aspartate-containing copolymer" as used herein. As noted above, "aspartate" may include aspartic acid as well as its salts.

"A polysuccinimide" generally refers to a succinimide homopolymer. However, it may also refer to a copolymer of succinimide, preferably with one or more comonomers selected from amino acids, dicarboxylic acids, tricarboxylic acids, alkyl amines, alkyl diamines, alkyl polyamines, amino sugars, and amino saccharides. Preferably, the comonomer is an amino acid, and most preferably is aspartic acid or aspartate. Such a copolymer will typically include at least 50 mole percent succinimide residues.

"Other amino acids" includes, for example, amino acids occurring in nature, stereochemical variants (i.e. D isomers or D,L mixtures, including racemic mixtures), and one- or two-carbon homologs thereof. "Dicarboxylic acids" and "tricarboxylic acids" preferably refers to aliphatic acids, preferably having up to 12, more preferably up to 6, carbon atoms, which may include carbon-carbon double or triple bonds. "Alkyl", as in alkyl amines, alkyl diamines, and alkyl polyamines, refers to a branched or linear carbon chain preferably having up to 12, more preferably up to six, carbon atoms.

II. Preparation of Copolymers: Reaction Sequences

The limitations relating to Mw, color, polymer morphology and/or water solubility in the current production of copolymers containing aspartate and succinimide, as described above in the Background of the Invention, are overcome by the compositions and methods disclosed herein. The product copolymers are distinct from the prior art aspartate/succinimide copolymers by virtue of greatly expanded range of Mw, light color, linear morphology, if desired, high water solubility, and the optional presence of residues of asparagine.

In general, and as described further below, preparation of the copolymers involves conversion of polysuccinimide to a water-soluble copolymer containing aspartate and succinimide residues, and typically also including asparagine residues. Alternatively, an aspartate/asparagine copolymer may be prepared. The molar-residue composition can be regulated with precision as desired or needed.

As disclosed herein, copolymers of aspartate with succinimide and/or asparagine can be produced in controlled molar ratios of these residues via a mild-alkaline, imide-ring-opening treatment. FIG. 1 is a reaction scheme illustrating selected embodiments of the invention.

As shown therein, a polysuccinimide (which may be prepared by any known method, including polymerization of aspartic acid, as depicted) is slurried in water, then subjected to alkaline ring-opening at mild temperature by treatment with ammonium hydroxide and sodium hydroxide (or other metal hydroxide), sufficient to fully convert the polysuccinimide to a clear solution of an asparagine:ammonium/sodium aspartate copolymer (FIG. 1, line 2). (Note that "ammonium hydroxide", or "aqueous ammonia", may include some amount of free ammonia as well.)

Other metal hydroxides, such as potassium hydroxide, can be used in the alkaline hydrolysis in place of, or in addition to, the sodium hydroxide. Similarly, other cationic counterions may be used, such as calcium, magnesium, zinc, aluminum, iron, barium, copper, molybdenum, nickel, cobalt, or manganese.

Removal of water, as well as ammonia, as explained below, yields a solid copolymer enriched in both aspartic acid and sodium aspartate (FIG. 1, line 3), and generally containing some residual ammonium aspartate.

If desired, this material is then ring-closed by thermal treatment sufficient to convert the aspartic acid residues to residues of succinimide (FIG. 1, line 4). The product is a copolymer having both imide character for ready derivatization and anionic character in the form of the aspartate residues, providing aqueous solubility over a wide range of composition and molecular weight, as well as polyanionic functionality. The molecular weight of the intermediate and product copolymers of the reaction is determined by the molecular weight of the starting polysuccinimide, which polymers are available at molecular weights of up to 100,000 Da or more, as discussed below.

The asparagine residues are formed during the alkaline ring-opening when aqueous ammonia, $NH_3$, itself a strong nucleophile, adds at the carbonyl carbon adjacent to the imide nitrogen to form a nondissociable amine terminus of the residue's pendant R-group. Significantly, the relative mole fraction of the asparagine residues can be engineered, as can the mole fractions of aspartate and remaining imide residues, to produce a class of definable and functional terpolymers of aspartate, asparagine, and succinimide, as well as copolymers of aspartate and succinimide or asparagine.

For example, the composition can be controlled by virtue of the fact that the relative nucleophilicity of the alkaline hydrolysis solution of ammonium hydroxide or ammonium-plus-sodium hydroxide is a function of pH. The residue ratio of the polymers is also a function of the relative amounts of ammonium hydroxide and sodium hydroxide used, as compared to the number of imide residues being treated.

To illustrate, if the hydrolysis is run at pH 9 or lower, the aqueous ammonia is predominantly in the form of ammonium, $NH_4^+$, the pK of the dissociation $NH_4^+=NH_3+H^+$ being approximately 9.25. The ammonium ion is not a nucleophile and therefore does not add covalently to the polymer, leaving the nucleophilic attack almost entirely to the hydroxide ions, $OH^-$, which generate aspartate residues upon attack at the carbonyl group adjacent to the imide nitrogen. Under these conditions, the proportion of asparagine residues in the final polymer is minimized.

Alternatively, the hydrolysis may be run at pH 10–11 or higher, at which the aqueous ammonia is present predominantly as $NH_3$, leading to an increasing number of succinimide residues being converted to asparagine rather than aspartate. However, as the pH increases, so does the amount of $OH^-$ ions, which compete successfully with the ammonia molecules at the sites of attack of the imide rings. Consequently, there always results a considerable mole fraction of succinimide residues that convert to aspartate rather than asparagine, even in the presence of concentrated aqueous ammonia.

Under higher pH conditions (up to about 11.5, which is typically a practical upper limit for aqueous $NH_4OH$ solutions), the proportion of succinimide residues in the final polymer, which arise from ammonium aspartate residues, as described immediately below, is minimized. (Alternatively, copolymers having no succinimide residues can be prepared simply by omitting the ring-closing step.)

The use of the mixed alkali solution of appropriate molarities of ammonium hydroxide and sodium hydroxide, for the ring-opening of polysuccinimide, at regulated levels of pH (e.g. about pH 10, as shown in Examples 5–6 below), produces a solution of polyaspartate having both ammonium and sodium as counterions. Upon drying, much of the ammonia is lost to the atmosphere (or vapor phase in the reactor) from the aqueous solution, due to the following equilibrium being forced to the left:

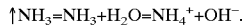

$$\uparrow NH_3 = NH_3 + H_2O = NH_4^+ + OH^-.$$

Thus, many or all of the ammonium cations, which act as counterions to the carboxylic group of aspartate residues, volatilize. This general reaction of ammonium salts is sometimes referred to as the "fugitive amine effect" (e.g. U.S. Pat. No. 6,174,988 to Guth et al., 2001).

In the process, base ($OH^-$) is consumed, with the concomitant increase of acid ($H^+$) by definition. The hydrogen cations, $H^+$, then become the counterions to the aspartate residues as the solution is dried, converting them to aspartic acid residues, provided the amount of sodium ion from the NaOH is insufficient to neutralize the carboxylate groups of the aspartate residues. (Accordingly, the absolute amount of NaOH should be substoichiometric relative to the number of aspartate residues if any residues are to be left as aspartic acid.)

Removal of the water gives a solid copolymer containing aspartic acid, sodium aspartate, and asparagine residues. If drying is accomplished under non-hydrolytic conditions (e.g. by convection or with forced-air at about 80° C.), some ammonium counterions, as well as residual water, typically remain (FIG. 1, line 3). These, however, are driven off during the early stages of the ring-closure step. During this step, the aspartic acid residues are thermally converted to imide residues by heating at, for example, 220° C. for 4 hours (FIG. 1, line 4). The final product is a copolyimide containing aspartate, asparagine, and succinimide residues, the mole fraction of each being selectable depending on the reaction conditions of pH and the relative amounts of ammonium and sodium hydroxide that are used during the ring-opening procedure, as described above.

Selected Variations

The composition of the products of the above reaction can be further varied in a controlled manner by varying the reaction conditions or reagents compositions. In one variation of the reaction, for example, the pH of the copolymer solution produced upon ring-opening is adjusted to about 2–6, typically to about 3–5, prior to drying and ring-closure (Examples 7–11). This modification was found to suppress color formation and promote ring closing during the subsequent heating step. As shown in Examples 7–11, the lower the pH of the solution, the higher the amount of succinimide residues (relative to aspartate residues) in the ring-closed product. HCl and common mineral acids were found to be suitable for pH adjustment.

Figure 2:
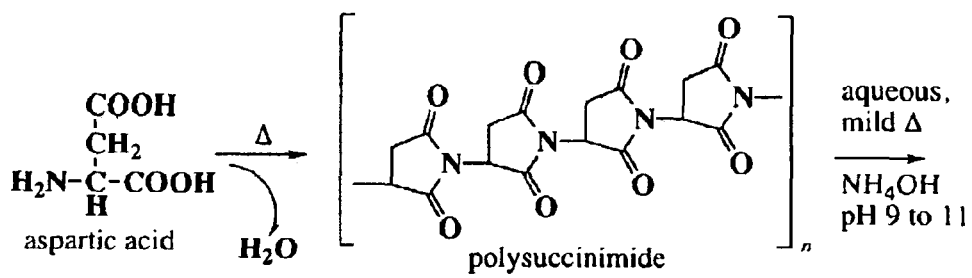
FIG. 2 is a reaction scheme showing the preparation of aspartate-asparagine-succinimide copolymers, in accordance with further selected embodiments of the invention, employing ammonium hydroxide for ring opening, with an optional pH adjustment step.
Figure 2:
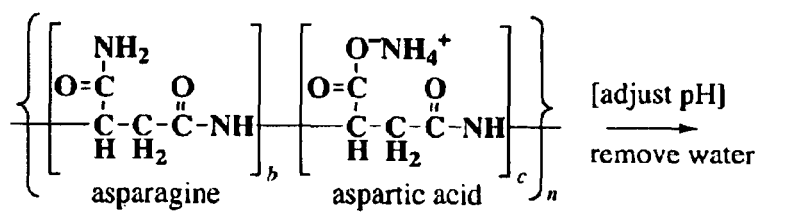
Figure 2:
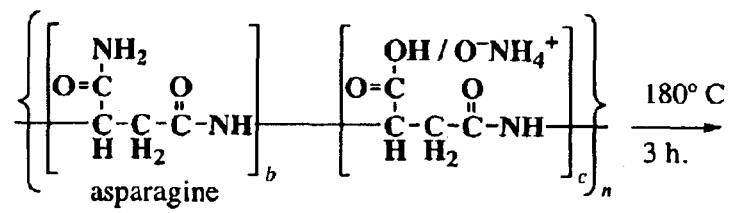
Figure 2:
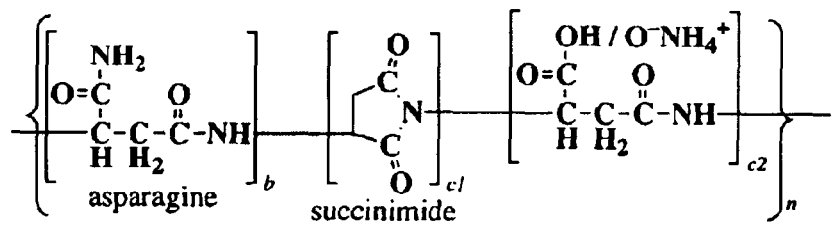

In another variation of the reaction, (Examples 12–13), the initial ring-opening of the polysuccinimide is carried out in concentrated ammonium hydroxide, without a metal hydroxide (see FIG. 2). A solution of a copolymer of ammonium aspartate and asparagine is produced (FIG. 2, line 2). Upon drying, the solution yields a copolymer of asparagine and aspartic acid (FIG. 2, line 2), typically in a residue ratio of about 3:2. As described in Examples 12–13 below, asparagine-enriched terpolymers were prepared by treating polysuccinimides with ammonium hydroxide, thus producing intermediate copolymers of ammonium aspartate and asparagine. Ring closure gave a terpolymer of ammonium aspartate, asparagine, and succinimide (FIG. 2, line 4).

Conversely, the mole % asparagine in the product can be reduced, by lowering the amount of ammonium hydroxide relative to metal hydroxide in the mild alkaline hydrolysis procedure of FIG. 1 (or, as discussed above, by carrying out this step at a pH value below the pK of the dissociation of ammonia).

Examples 14–15 illustrate reactions combining these modifications, where the ring opening is carried out with ammonium hydroxide alone, and the pH of the solution is adjusted prior to drying and ring closure (also illustrated, as an optional step, in FIG. 2). Ring closure gives a terpolymer of aspartic acid (and/or ammonium aspartate), asparagine, and succinimide.

The presence or absence of aspartic acid residues can thus be controlled by factors such as the presence and amount of NaOH (or other metal hydroxide) used during the initial ring-opening reaction, or the pH of the resulting solution prior to drying.

Alternatively, the quantity of aspartic acid residues (and thus succinimide residues in the ring-closed product) can be reduced by the addition of salts of sodium or other cationic counterions to solutions of ammonium polyaspartates prior to drying. This procedure, demonstrated in Examples 16–17, was used to increase the number of aspartate residues, and thus the solubility, of the high-asparagine polymers prepared by the procedures of Examples 14–15. In using this approach, the pH of the solution should be maintained in the range of the pK of the dissociable carboxylic groups of the aspartate residues (both α and β forms). Accordingly, some of the carboxylic groups must be in the associated form (COOH). In this circumstance, any excess sodium ion will precipitate as the solid nonalkaline salt, and will not prevent ring-closure of aspartic acid residues of the dried polymers.

The invention process may also be carried out on succinimide copolymers, such as a copolymer of succinimide and aspartate, as shown in Example 18. In this Example, an aqueous solution of such a copolymer, having a 1:1 residue ratio, was treated with concentrated ammonium hydroxide, and the product was dried overnight at 80° C., which removed excess ammonia. The product was then redissolved in water, the pH adjusted to 4.0, and the solution redried at 80° C. The product was then heated at 180° C. under vacuum for ring closure. The resulting product was a water soluble terpolymer of sodium aspartate, asparagine, and succinimide in a mole ratio of 0.56:0.94:1. Corresponding reaction of a starting material having a 1:2 residue ratio (aspartate to succinimide) gave a water soluble terpolymer with a 0.53:1:0.97 mole ratio.

As is clear from the above description, the invention provides methods of producing terpolymers of aspartate (metal, ammonium, or aspartic acid), asparagine, and succinimide having varying ratios of these residues, which can be controlled by varying different parameters of the process, e.g. the presence or amount of metal hydroxide, the pH of the polymer solution prior to drying, presence of salt, conditions of ring closure, etc. To illustrate, the following Table gives the molar ratios of aspartate (sodium or ammonium), asparagine and succinimide in terpolymers prepared by the exemplary reactions described in Examples 7–18. (The ranges of molar ratios are exemplary only and are not intended to be limiting.)

TABLE 1

Residue Mole % Compositions of Exemplary Copolymers

| Example | Conditions[a] | Asp | Asn | Suc |
|---|---|---|---|---|
| 7 | pH 5 | 51% | 34% | 15% |
| 8 | pH 4.5 | 42% | 42% | 17% |
| 9 | pH 4 | 32% | 42% | 26% |
| 10 | pH 3.5 | 19% | 33% | 48% |
| 11 | pH 3.0 | 10% | 40% | 50% |
| 13 | NH$_4$OH only | 15% | 66% | 19% |
|  |  | 15% | 68% | 17% |
| 14–15 | NH$_4$OH only; pH 4–4.5 | 12% | 53% | 36% |
|  |  | 6% | 43% | 51% |
| 16–17 | NH$_4$OH only; pH 4–4.5; NaCl added | 21% | 55% | 24% |
|  |  | 17% | 54% | 29% |
| 18 | Copolymer starting matl. | 22% | 38% | 40% |

[a]See Examples for full descriptions.

Copolymers of Aspartate and Succinimide by Ion Exchange

The invention further provides methods of generating copolymers of aspartate and succinimide (i.e. having no asparagine residues). Copolymers thus prepared have a greatly expanded range of Mw, linear morphology (if desired), and excellent color (if desired), as compared with prior art products.

For example, homopolymers of sodium aspartate and other aspartate-enriched polymers can also be converted to imide-containing polymers by adjustment of solutions of the polymers into the pH range of the dissociation of carboxylic groups of aspartic acid, followed by thermal ring-closure of the aspartic acid residues (see Example 19). Accordingly, several sodium aspartate polymers were converted into copolymers containing sodium aspartate and succinimide, by adjusting aqueous solutions of the polymers to pH 3–5, drying, and heating to effect ring-closure as described above.

Alternatively, a solution of sodium polyaspartate, prepared by ring-opening of polysuccinimide as described above (e.g. with sodium hydroxide at pH 10 for 1–2 hours at 60° C.), can be partially converted to polyaspartic acid residues by addition of a substoichiometric amount of an insoluble cation exchange material, such as sold under the trade name of Dowex® or Amberlyst®. The sodium ions (or other cationic counterions) that are released are bound to the exchange material, which can then be removed by screening or filtration, leaving a solution of poly(aspartic acid-sodium aspartate). This solution is then dried to form a solid copolymer. The dried material is thermally treated, for example at 220° C. for 1 to 4 hours, effective to condense the aspartic acid residues to succinimide residues.

Alternatively, the solution of sodium polyaspartate, prepared as described above, may be pumped through a cation-exchange device having countercurrent flow channels separated by exchanging membranes, where one flow channel contains the sodium polyaspartate to be exchanged, and the countercurrent flow contains a mineral acid, with flow parameters and pH set to partially remove the sodium ions (or other counterions). An electrodialysis membrane-flow system may also be set up to partially remove the cationic counterions from a solution of polyaspartate. In each case, the outflow contains the copolymer of aspartic acid and sodium aspartate. The water is removed from the copolymer solution, and the resulting solid is converted to the aspartate/succinimide copolymer by thermal treatment.

Figure 8:
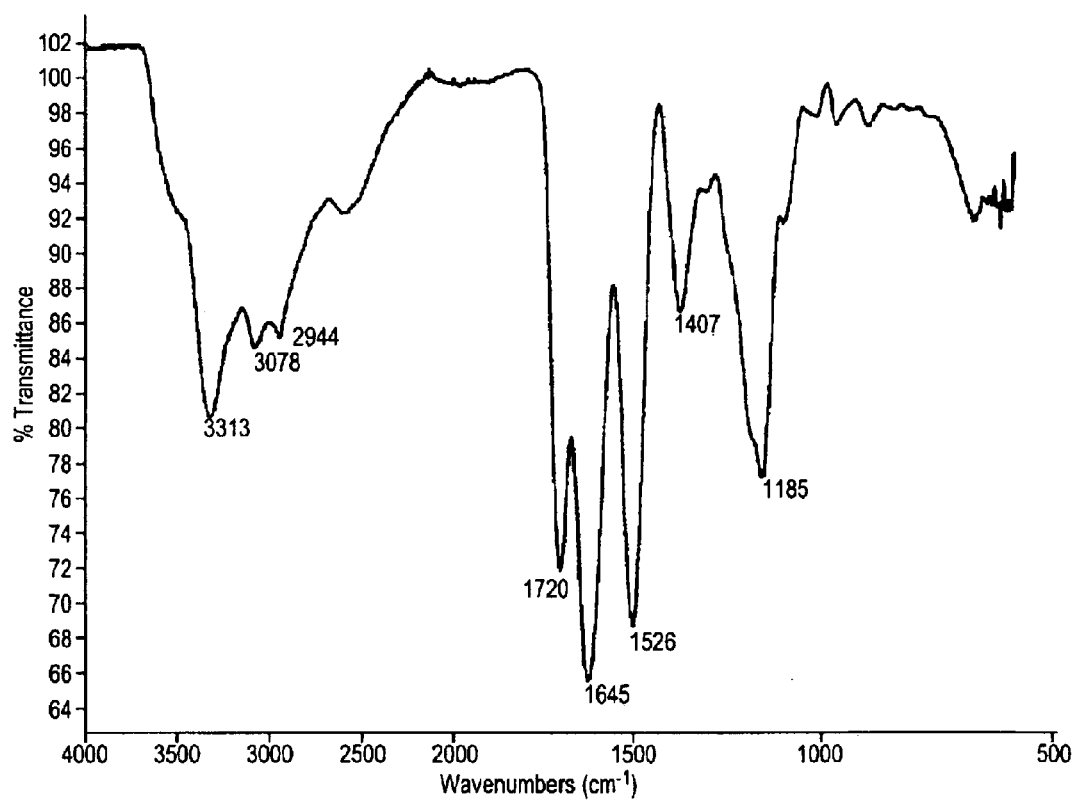
FIG. 8 is an infrared spectrum of the aspartic acid/succinimide copolymer of Example 19, prepared by acidification via dialysis and lyophilization of sodium polyaspartate, showing a clear imide signal at 1720 $cm^{-1}$.

In another variation (Example 19), a solution of sodium polyaspartate (produced by mild alkaline ring opening of a 30 kDa polysuccinimide, which was in turn produced by thermal treatment of aspartic acid according to Example 2) was dialyzed against large volumetric excesses of 0.1 N HCl to convert the sodium polyaspartate to polyaspartic acid and remove the sodium counterions. The solution was then dialyzed two further times against 0.01 N HCl to remove excess HCl, and the dialysate, containing the polyaspartic acid, was lyophilized, removing residual HCl and producing fine, powdery flakes of an aspartic acid/succinimide copolymer (FIG. 8). This is believed to be the first demonstration of the conversion of aspartic acid residues to succinimides under the conditions of mild acidic dialysis and lyophilization.

III. Preparation of Copolymers: Exemplary Methods of Production

A. Starting Polysuccinimide

By the methods of the present invention, the reaction may begin with a preformed polysuccinimide, such as available from several commercial suppliers, or the polysuccinimide may be prepared, e.g. by polymerizing aspartic acid or its precursors. Polysuccinimides produced by any method known in the art may be converted to the present imide-containing copolymers, thus enabling the selection of high molecular weight forms, as produced for example via phosphoric acid catalysis. In addition, low-color forms of polysuccinimide, such as result from acid catalysis, from polymerizations in which bisulfate is used as an additive, or from solution polymerizations, may be selected.

The colored adduct that darkens conventional polysuccinimide and polyaspartates, often thought to be related to diketopiperazine (cyclic dimer of amino acids) formation, occurs early in the polymerization. Once the polysuccinimide is formed or even partially formed, there is no noticeable increase or change in its color upon further heating, provided the products are not burned due to overheating. Therefore, the color of the converted copolyimides of the present invention depends on the color of the starting polysuccinimide, which may be very light in color. Accordingly, linear, low-color, water-soluble copolyimides of the entire range of Mw currently known in the art for polysuccinimides are provided by the present invention.

Synthesis of polysuccinimides has been described in the art for literally over 100 years. Any method of production of polysuccinimide may be used to make the starting polysuccinimide. A summary of established methods has been provided in prior U.S. Patent Nos. to Sikes and coworkers (1999, U.S. Pat. No. 5,981,691; 2002, U.S. Pat. No. 6,495,658), which are incorporated by reference. In addition, more recently described approaches are summarized in Table 2; the patents cited therein are likewise incorporated herein by reference.

TABLE 2

Selected Manufacturing Methods for Production of Polysuccinimide

| Thermal Manufacturing Processes | Patent Number | Year | Authors |
| --- | --- | --- | --- |
| Two-stage methods: drier plus high viscosity reactor | | | |
| extruder + drier | U.S. Pat. No. 6062961 | 2000 | Kromer, M. |
| evaporator + 50 m helical tube reactor | U.S. Pat. No. 6054553 | 2000 | Groth, et al. |
| helical evaporator + List reactor | U.S. Pat. No. 6187898 | 2001 | Wagner, et al. |
| Solution polymerization: cyclic carbonate solvent + acid catalysis | U.S. Pat. No. 6197897 | 2001 | Mazo, G. et al. |
| | U.S. Pat. No. 6399715 | 2002 | |

Polysuccinimides may also be produced via fermentation of carbohydrates to fumaric acid, followed by enzymatic conversion of fumaric acid to a solution of ammonium aspartate. The ammonium aspartate solution is then dried (with loss of ammonium ions as ammonia to the vapor phase), and the resulting solid polymerized to polysuccinimide by thermal polycondensation (Mukouyama and Yasuda, 2001, U.S. Pat. No. 6,300,105; Eyal et al., 2002, U.S. Pat. No. 6,344,348). Other workers have used ammonium aspartate solutions, in these cases produced chemically and enzymatically, but not via fermentation, to prepare polysuccinimide via thermal polymerization (Wang, 2000, CN 1267673; Cami et al., 2001, U.S. Pat. No. 6,274,698).

The resulting polysuccinimides may range in color from white to dark reddish. They may be branched or unbranched in molecular morphology. Their molecular weights may range from the oligomeric (several 100 daltons) to approximately 100,000 daltons or more.

The starting materials for production of the polysuccinimides may include maleic anhydride, maleic acid, ammonia, glucose (fermentation route), or any other aspartic acid precursor. Aspartic acid itself is a preferred monomeric feedstock for production of polysuccinimide.

It is recognized that commercial polysuccinimides may contain low levels (<10 monomer %) of residues other than succinimide, either internally or as end groups, depending on the method of synthesis. Particularly, the maleic-plus-ammonia route leads to some measurable incorporation of imino succinyl units as well as malic, maleic, and fumaric units (Groth et al., 2000, U.S. Pat. No. 6,054,553). Similarly, trace (<1 monomer %) amounts of maleimide, fumaramic, maleic, and fumaric end groups have been reported as components of polysuccinimides produced via thermal condensation of aspartic acid (Matsubara et al., *Polymer Preprints* 37(1), 699–700, ACS Spring Meeting, 1996; *Macromolecules* 30(8), 2305–2312, 1997).

It is also important to note that many comonomers other than aspartic acid and its precursors have been contemplated for copolymerization to form polyimides rich in succinimide but also containing other residues. Such comonomers include all of the amino acids, many dicarboxylic acids and tricarboxylic acids such as adipic acid, malonic acid, and citric acid; many other mono-, di-, and polyamino compounds such as amino caproic acid, caprolactam, diaminohexane, triaminopropane and others; amino sugars and amino saccharides; and a multitude of other comonomers.

B. Ring Opening

Once a polysuccinimide, or method for production of polysuccinimide, is selected according to specifications for Mw, color, and molecular morphology, the polysuccinimide so obtained typically is slurried in water up to 40 to 45% by weight of the resulting polyaspartate. Any suitable tank or reaction vessel may be used.

Next, the pH is adjusted within the range of 8 to 12, preferably 9 to 11, depending on the relative amount of asparagine and/or succinimide residues desired in the final product. The alkali used in this step may be ammonium hydroxide or a co-solution of ammonium hydroxide and a metal hydroxide, preferably sodium (or potassium) hydroxide, the ratio of the two chosen according to the relative amounts of succinimide and aspartate residues that are desired in the final product. For example, for roughly equimolar levels in the resulting copolymer of succinimide and aspartate residues, but still possibly containing residual levels of asparagine residues, the alkali is set as a 1:1 molar solution of ammonium hydroxide and sodium hydroxide.

The ring-opening reaction is carried out at a temperature in the range of about 65–90° C., e.g. about 80° C. The pH is preferably held at the target value by use of an automated ph-stat titrating device.

In accordance with a useful feature of the reaction, as discussed above, the ammonium hydroxide component can be made more nucleophilic, less nucleophilic, or essentially non-nucleophilic by adjusting the pH relative to the pK (~9.25) of the dissociation of aqueous ammonium ion. Consequently, to produce copolymers with 10 mole % or fewer asparagine residues, which result from addition of ammonia to the succinimide ring, it is preferred to run the ring-opening reaction at pH 9 or less (down to about pH 7). On the other hand, to produce copolymers with up to 50% or more asparagine residues, the reaction can be run preferably at pH 11 or higher (up to about pH 12).

Note also that, as is the case for all polysuccinimides, during the ring-opening, the aspartate residues of the resultant polymer may be in either the $\alpha$ or $\beta$ form, depending on which carbonyl carbon is the site of the attack. The prior art and professional literature show that the $\beta$ form is favored to some extent, sometimes up to 80%, depending on the conditions of the ring-opening.

C. Removal of Water

The resulting copolymer solution is dried, to near or complete dryness, to produce a concentrated product of a water-soluble copolymer. If ammonium hydroxide alone was used in the ring-opening step, a copolymer of ammonium aspartate and asparagine results. Aspartic acid residues may also be present if the drying step is sufficient to drive off some or all of the ammonium counterions. If a co-solution of ammonium hydroxide and a metal hydroxide is used, a copolymer of ammonium aspartate, sodium aspartate, and asparagine results. Again, depending on the effectiveness of the drying step in converting aspartate residues to aspartic residues, aspartic acid residues may also be present.

Any suitable oven, drier, evaporator, spray-drier, distillation, solvent-extraction or other method of removal of water may be used in this step of concentrating and drying. The drying step may be accomplished by any method known in the art, e.g. simple heating by convection, mild heating by forced air, spray drying, freeze drying, and others. The copolymers may be precipitated from aqueous solution by lowering the pH, isolated by filtration or centrifugation, washed with an anhydrous solvent such as isopropanol, then air dried at room temperature or elevated temperature.

The polymer chains of the higher Mw polymers may become partially hydrolyzed via drying at elevated temperature, and thus converted to polymers of lower Mw. Consequently, non-hydrolytic methods of drying, such as spray drying or solvent precipitation, are preferred, to preserve the molecular size of the product copolymers. It is also desirable to keep the drying temperatures below 90° C., preferably in the range of 80° C. Alternative methods of drying, such as partial vacuum and lower temperature methods, or solvent methods, may be used.

For example, an organic solvent, either miscible or immiscible with water, can be added to precipitate the copolymer, again followed by filtration or centrifugation, and then drying as above. Examples of water-miscible solvents for such use are isopropanol and ethyl acetate, among others. Water immiscible solvents for precipitation of the copolymers include ethers such as tert butyl ether and decanol, among others.

The use of water may also be minimized or substantially eliminated in a manner analogous to the approach of Martin (U.S. Pat. No. 5,859,149). That is, the polysuccinimide may be slurried in an organic solvent such as dodecane, to which is added a substoichiometric amount (with respect to the amount of succinimide residues in the polysuccinimide) of powdered NaOH. To this mixture is further added an amount of ammonia or ammonium hydroxide sufficient to complete the hydrolysis of the imide rings. Alternatively, an admixture of dry polysuccinimide plus powdered NaOH plus ammonia in water vapor may be used in appropriate amounts to effect the differential hydrolysis.

In the case of the higher Mw copolymers, the solution may become highly viscous as it approaches dryness. In such cases, it is necessary to use a high-viscosity reactor (for example, List reactors, extruders) for the final step of complete drying and ring-closure, described below.

It has also been found that, the more acidic the solution prior to drying (preferably pH 3. to 6), the more stable are the polymer products during ring-closure. In addition, the ring-closure itself is favored at lower values of pH.

D. Ring Closing

The ring-closing reaction, to produce copolymers containing succinimide residues, is accomplished by providing sufficient heat for a sufficient interval of time, for example 160° C. to 220° C. for 1 to 4 hours, preferably about 180° C. for 3 hours. Asparagine residues are more labile to oxidation and thermal decomposition than are aspartate residues. Consequently, it is particularly useful and effective to run the ring-closure reaction in the lower range, 160° to 190° C., to preserve asparagine residues. Oxygen should be excluded to preserve asparagine residues as well as to suppress color formation in the product copolymers. Use of these lower temperatures and exclusion of oxygen, in addition to the use of a lower pH solution during the initial drying step, permits asparagine-rich copolymers to undergo ring closure without thermal decomposition of the asparagine residue or appreciable color formation. Asparagine-free copolymers can generally be dried from solution without pH adjustment and ring-closed efficiently at temperatures of about 190° to 240° C. in a conventional oven.

Depending on conditions of stirring and heat-exchange, it is also possible to run the reactors at much higher temperatures for much shorter residence times to accomplish the ring-closure. For example, temperatures as high as 350° C. with residence times of 5 minutes or less are contemplated.

IV. Exemplary Compositions and Properties of the Subject Copolymers

Percentage residue-mole compositions of the subject copolymers may range from 5 to 90% as sodium aspartate, 0 to 80% asparagine, and 0 to 90% succinimide (where mole % asparagine and succinimide are not simultaneously zero). A preferred % residue composition of the product copolymer is 50% sodium aspartate:. 50% succinimide. Another preferred % residue composition is 50% sodium aspartate, 5% asparagine, and 45% succinimide. Another preferred % residue composition is 30% sodium aspartate, 5% asparagine, and 65% succinimide. Another preferred % residue composition is 20% sodium aspartate, 60% asparagine, and 20% succinimide. Many other useful % residue compositions are contemplated.

A preferred embodiment includes copolymers of aspartate and succinimide having residue ratios ranging from 10:1 to 1:10. Particularly preferred embodiments are copolymers of aspartate and succinimide having residue ratios of 4:1 to 1:4, more preferably 1:2 to 2:1, most preferably 1:1. Other preferred embodiments are copolymers of aspartate, asparagine, and succinimide having residue ratios of 10:0.5:0.5 (approx. 91/4.5/4.5) to 4:0.75:0.25 (80/15/5) to 1:0.05:0.95 (50/2.5/47.5) to 0.2:0.05:1 (16/4/80). Preferred copolymers of aspartate, asparagine, and succinimide that emphasize the succinimide functionality preferably have residue ratios of 1:0.05:3.95 (20/1/79) to 1:0.0.05:9.95 (9/0.5/90.5). Preferred copolymers of aspartate, asparagine, and succinimide that emphasize the asparagine functionality have residue ratios of 0.2:1:0.2 (14/72/14) to 1:4:1 (17/66/17).

Preferred molecular weights of the copolymers range from 600 to about 100,000 Daltons and higher. More preferably, the Mw ranges between 2000 and 100,000. Most preferably, the range in Mw is 3000 to 100,000; in further embodiments, the molecular weight is 10,000 to 100,000. Particularly preferred Mw's include 600, 1500, 3000, 5000, 10,000, 30,000, 70,000 and 100,000, and ranges therebetween, depending on the uses of the copolymers. For example, most preferable Mw's for scale control and corrosion inhibition are 3,000–5,000. Most preferable Mw's for additives to detergents are 10,000–20,000. Most preferable Mw's for thickening agents in lotions and shampoos are 60,000–75,000. Most preferable Mw's for crosslinking to form gelling materials are 75,000–100,000 or higher.

The molecular morphology of the copolymers ranges from highly branched to unbranched. Preferred morphologies for branched copolymers have branch points at every other, every third, every fourth, or every fifth residue, typically on a random basis. Particularly preferred is the copolymer having branch points at every other residue on average.

Preferred morphologies for relatively to fully unbranched copolymers range from having a branch point at every sixth residue on average to having no branch points, in other words being completely linear and unbranched in morphology. Preferred morphology for the relatively unbranched to completely unbranched copolymers exhibits branch points at every sixth, every seventh, every eighth, every ninth, every tenth, every fifteenth, every twentieth residue, typically on a random basis. Particularly preferred is the morphology that has no branch point along the polymer backbone.

The color of the copolymers in solid forms ranges from white to dark reddish. Preferred colors range from tan to white. Particularly preferred colors are very light amber, cream-color, and white.

The colors of concentrated, aqueous solutions of the copolymers (~40 to 50% by weight) range from dark reddish to light amber to clear, "water-white". Preferred colors of the solutions range from light amber to clear. Most preferably, the color of the solutions is clear, "water-white".

The copolymers of the invention are frequently highly water soluble over a wide range of composition and molecular weight. This water solubility is a significant advantage in that, for example, it permits ready derivatization of the copolymers in aqueous solution, as described further below. Preferred copolymers are those having 95% or more, preferably 99% or more, aqueous solubility at room temperature.

In general, water solubility increases with decreasing mole-fraction of imide residues, and to a lesser extent, with decreasing mole fraction of asparagine residues. Copolymers which are less water soluble (i.e. having high mole fractions of these residues) may be used, for example, as reactive intermediates in specific solvents and solvent formulations, or as active and miscible components of specific product formulations that may or may not have predominantly aqueous properties.

The preferred solvent for reactions and uses involving the copolymers is water. In some cases, due to the specific characteristics of a particular copolymer or product in which the copolymer is formulated, the preferred solvent is an alcohol, particularly isopropanol. Nonpolar solvents may also be preferred in particular circumstances; for example, dimethyl formamide, dichloromethane, and N-methyl pyrrolidone are preferred organic solvents. Miscible solutions of two or more of each of these solvents also are preferred for specific products and reactions, particularly aqueous, alcoholic solutions.

V. Derivatization of the Subject Copolymers

As noted above, a principal advantage of the copolymers of the present invention over traditional polysuccinimides is their high water solubility, thus enabling ready nucleophilic derivatization in an aqueous environment. Thus, one of the principal uses of the present copolymers is to serve as a polymer backbone or platform for synthesis of many value-added, functional derivatives.

A variation of this concept is to conjugate the copolymers of the present invention with other polymer backbones such as polysaccharides and proteins. Thus an abundantly available and inexpensive polymer backbone which is essentially inert, such as starch or cellulose, can be "decorated" and functionalized. In the case of proteins and enzymes, these can be stabilized or coated by attachment of the copolymers of the present invention, to extend the useful period of performance of the proteins and enzymes.

Another beneficial feature of the present polymers is the presence of the nondissociable amide $NH_2$ of the R-group of asparagine residues, which is itself functional and derivatizable. Polyasparagine is moderately active, for example, as a scale inhibitor. Moreover, asparagine residues are analogous to the acrylamide residues of conventional vinyl polymers. Polyacrylamides and copolymers of acrylic acid and acrylamide (PAM's) have been widely commercialized. For example, copoly(acrylic, acrylamide) has been introduced as a soil-retention agent for use in prevention of erosion (Sojka, Lentz and coworkers, 1993, 1997, 1998, 2000; Orts et al., 2001). The copolymers of the present invention, including the simple subset of molecules of copoly(aspartate, asparagine), may similarly find such uses in agriculture.

Beyond this, the pendant amide nitrogen along the backbone of such acrylic acid/acrylamide copolymers has been successfully derivatized, for example, with sulfonate and phosphonate groups via transamidation reactions (Fong, 1987, U.S. Pat. No. 4,703,092). Terpolymers of acrylic acid, acrylamide, and phosphonated- or sulfonated-acrylamide have found commercial uses for mineral scale control, dispersancy, and corrosion inhibition, among other uses. Similarly, the analogous terpolymers of aspartate, asparagine, and succinimide can be so further functionalized and used.

Amidation reactions may be used to similarly functionalize the carboxylic groups of aspartate residues (Fong, 1991; U.S. Pat. No. 5,035,806). This can be done separately or in combination with functionalization of either or both of the imide residues and the asparagine residues.

Nucleophilic reagents may be added to the succinimide residues in the copolymer, at a carbonyl carbon, to form linkages to the backbone of the copolymer. Common nucleophiles include, for example, amine, hydroxyl, and thiol groups. For example, amino compounds react with one of the carbonyl carbons of the imide ring to form a side chain amide linkage (as shown below). Alternatively, side chain ester linkages may be formed at the carbonyl carbons in the case of alcohols or other hydroxy-containing compounds, such as carbohydrates or polysaccharides.

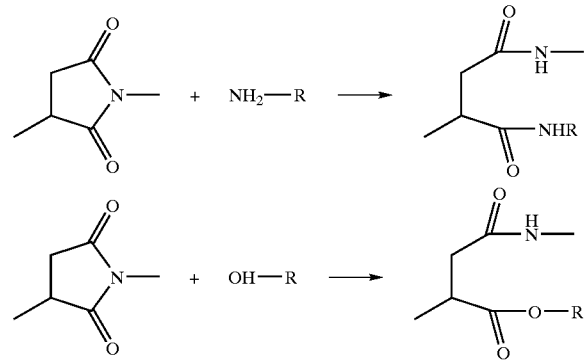

Amino compounds add most efficiently to the imide ring at a pH about 1 pH unit above the pK of the dissociable amine group of the subject amino compound, typically in the range of pH 8 to 12, preferably 10.5. to 11.5. Hydroxyl containing compounds as nucleophiles also are best added in this nucleophilic range of pH. Given adequate mixing, such reactions generally occur at room temperature over the interval of an hour or more. At elevated temperatures, for example 60° C., the reactions are accelerated, occurring within minutes or even seconds depending on optimization of reaction conditions.

As noted above, the derivatization reactions are preferably carried out in an aqueous environment. In this sense, an "aqueous environment" refers to an aqueous suspension or, preferably, a solution, in an aqueous solvent. Preferably, the aqueous solvent is water; however, the term also includes mixtures of water with a cosolvent, preferably a water-miscible cosolvent, such as lower alkyl ketones (e.g. acetone, MEK), alcohols (e.g. methanol, ethanol, propanol, isopropanol, butanol, isobutanol) or ethers (e.g. dioxane, tetrahydrofuran, ethylene glycol dimethyl ether, 2-methoxy ethanol), N-methyl-N-pyrrolidone, sulfolane, dimethyl acetamide, acetonitrile, dimethyl formamide, dimethyl sulfoxide, pyridine, ethyl acetate, or propylene carbonate. If the copolymer is not completely soluble in water, a suspension or emulsion may be used. In many cases, the polymer will dissolve as the reaction progresses.

Other solvents in which the copolymers are soluble or dispersible may, of course, also be used for derivatization of the copolymers. In some cases, owing to the specific characteristics of a particular copolymer or product in which the copolymer is formulated, the preferred solvent is an alcohol, particularly isopropanol. Nonpolar solvents may also be preferred in particular circumstances; for example, dimethyl formamide, dichloromethane, and N-methyl pyrrolidone are preferred organic solvents. Miscible solutions of two or more of each of these solvents also are preferred for specific products and reactions, particularly aqueous, alcoholic solutions.

Given the versatility of the copolymers as synthetic intermediates, the number of possible derivatives is very large. Some examples of preferred derivatives, which are only a few selected among many and in no way are to be considered limiting, include dispersants having amino polyoxyalkylene functionality; softeners and emollients having amino siloxane groups; water-treatment derivatives having amino phosphonate or amino sulfonate pendant additive groups; cationized functional groups for adhesion, strengthening, and binding agents; and others. Other preferred examples include esters of carbohydrates and saccharides, for example of starch, cellulose, or lignin. Similarly preferred are the copolymers derivatized to form esters with alcohols, fatty alcohols, glycols, polyglycols, and lipids.

In particular, the invention provides a method of covalently conjugating a succinimide-containing copolymer of the invention with a hydroxyl-containing polymer, such as starch, a cellulosic polymer, a polyglycol, a polyalcohol, a gum polysaccharide, or pullulan. Various embodiments are described in Examples 20–23, using corn starch and potato starch. In general, the imide-containing copolymer is added to the hydroxyl-containing polymer in water. The pH is adjusted into the nucleophilic range, preferably in the range of 9 to 12, most preferably 10.5 to 11.5. Under these conditions, a graft of the two polymers is formed. As shown in Examples 21–23, such products can be useful as flocculating agents, particularly when the succinimide-containing copolymer is asparagine-enriched, and/or when a relatively low Mw copolymer is used.

VI. Uses of the Subject Copolymers

The aspartate copolymers can be used in numerous applications of aspartate copolymers which are known in the art. Such applications are manifold and include, for example, detergent additives, coatings, additives to coatings, corrosion inhibitors, scale inhibitors, and additives for personal care products such as shampoos, conditioners, and lotions. Particularly preferred uses include gelling materials as superabsorbents and controlled release vehicles, agricultural additives, including controlled release formulations and erosion-control/water-conservation agents, plasticizers for starch and other polysaccharides, e.g. for use in biodegradable packaging, functional modifiers of starch and other polysaccharides such as cellulose, cosmetic uses, nanospheres and particles, modifiers for biological molecules and surfaces including enzymes and cell coverings, e.g. enzyme stabilizers, and a variety of biomedical applications related to drugs, topical agents, and other therapeutic treatments. The copolymers may also be used as crosslinkers for powder coatings, additives in removable coatings, and additives in composites (e.g. minerals/fibers with organic binders).

As described above and in Examples 21–23, copolymers of the invention can be used to prepare flocculating agents. Specific applications of such materials include use as clarifying agents in water treatment and sewage treatment, and as soil-retention and water-conservation agents in agriculture.

Table 3. The polymers of the present invention can also be used according to these teachings, incorporated herein in their entirety by reference.

Methods of formulating or preparing compositions for the uses disclosed herein using aspartate copolymers are known and available to those skilled in the art, and include methods described in the references cited in this section. As discussed above, use of the aspartate copolymers of the invention imparts benefits such as high molecular weight, good color, aqueous solubility, and control of composition of the copolymer.

TABLE 3

Selected Uses of Aspartic Acid-Containing Polymers

| Use | Patent No. | Year | Authors |
|---|---|---|---|
| Additives for powder coatings: Binders, x-linkers, flow levelers | U.S. Pat. No. 6,114,489 | 2000 | Vicari et al. |
| Adhesives, wet/dry strength agents for paper products | U.S. Pat. No. 6,174,988 | 2001 | Guth et al. |
| Binders for ceramic green structures (presintering) | U.S. Pat. No. 6,075,082 | 2000 | Workman et al. |
| Carrier molecules for medical diagnostics | U.S. Pat. No. 6,228,344 | 2001 | Dorshow et al. |
| Cleansing agent, plus wood chips, for plastic surfaces | U.S. Pat. No. 6,231,680 | 2001 | Gerlach and Lehmann |
| Coating for controlled release fertilizer | JP 2002191206 | 2002 | Yashuda et al. |
| Controlled release from degradable plastics | U.S. Pat. No. 6,239,192 | 2001 | Muller et al. |
| Deicing compositions | U.S. Pat. No. 6,287,480 | 2001 | Berglund et al. |
| Deposit control | U.S. Pat. No. 6,187,195 | 2001 | Zarges et al. |
| Reverse-osmosis membranes Standing water, flowing water | U.S. Appl. No. 20020125199 | 2002 | Sicius et al. |
| Detergent additives | WO 03/14193 | 2002 | Jordan and Gosselink |
| Dispersants, abrasive cleansers | U.S. Pat. No. 6,245,157 | 2001 | Gerlach et al. |
| Dispersants, abrasive polishes | JP 200109799 | 2000 | Koyama et al. |
| Dispersants/thickeners for emulsion polymerization | U.S. Pat. No. 6,143,817 | 2000 | Hallam et al. |
| Gas hydrate inhibitors | U.S. Pat. No. 6,232,273 | 2001 | Namba et al. |
| Hairspray additives | JP 200191475 | 2000 | Masaya et al. |
| Insulating films for liquid crystals | U.S. Pat. No. 6,221,443 | 2001 | Kuboto et al. |
| Ion-exchange elements for metal-sequestration membranes | U.S. Pat. No. 6,139,742 | 2000 | Bhattacharyya et al. |
| Linkers of active agents to proteinaceous surfaces (hair, skin, nails, fur, etc.) | WO 00/59458 U.S. Pat. No. 6,303,794 | 2000 2001 | Guth et al. |
| Microspheres for medical imaging | U.S. Pat. No. 6,200,548 | 2001 | Bichon et al. |
| Pigment dispersants for Ink-jet printers | U.S. Pat. No. 6,110,266 | 2000 | Gonzalez-Blanco et al. |
| Regulation of cationic hormones | U.S. Pat. No. 6,054,555 | 2000 | Engel et al. |
| Set retarder, non-dispersing in subterranean cementing | U.S. Pat. No. 6,419,016 | 2002 | Reddy |
| Solubilizing insoluble drugs | U.S. Pat. No. 6,262,107 | 2001 | Li et al. |
| Stain removal | U.S. Pat. No. 6,068,665 | 2000 | Calton and Cook |
| Sustained releasing drugs | U.S. Pat. No. 6,419,951 | 2002 | Shinoda et al. |
| Tanning additive for leather | U.S. Pat. No. 6,254,644 | 2000 | Traubel et al. |
| Thixotropic flow agents | U.S. Appl. No. 20020193279 | 2002 | Klein et al. |

Over 100 established uses of polyaspartate and its derivatives are summarized in U.S. Pat. No. 6,495,658 to Sikes and coworkers, these uses incorporated herein by reference. The copolyimides of the present invention can likewise be applied in the cited uses. Some examples of the more common uses include detergent additives, both commodity and specialty; water-treatment chemicals, including scale control, corrosion inhibition, dispersancy, among others; and additives for personal-care products such as lotions and shampoos.

In addition, some other uses that have more recently been described for aspartic-containing polymers are indicated in

EXAMPLES

The following examples are intended to illustrate but in no way limit the invention.

Methods.

Molecular weight. The molecular weights of the copolymers were determined by gel permeation chromatography (GPC), with commercial polyaspartates and polyacrylates as standards. In addition, the molecular weights of specific copolymers were measured by mass spectroscopy (matrix-assisted, laser desorption (MALDI MS) with time-of-flight detector), and then used themselves as standards for GPC determinations.

Color. The color of the copolymers, both as solids and aqueous solutions, was assessed by visual comparison to color standards (ASTM) available from commercial sources. In addition, the ultraviolet and visible light spectra of standard aqueous solutions of the copolymers were compared to indicate the intensity of color development at particular wavelengths.

Molecular morphology. Branching versus linearity of the copolymers was assessed in two ways. The first employed an advanced method in atomic force microscopy. The second utilized quantitative titration of the C-terminal, carboxylic end-groups of polysuccinimide molecules. The number of end groups as compared to the known molecular weight of the molecules can provide an indication of the number of branches, as each branch has an end group.

Atomic force microscopy. First, a novel method of atomic force microscopy (AFM) was used to visually inspect the appearance of the molecules at the nanometer and angstrom levels. The method involved first immobilizing the polymers at the surfaces of calcite crystals by allowing the polymers to embed themselves partially at growing crystal surfaces by placement of functional groups of the copolymers into lattice positions of the crystal surface. The polymers, so immobilized and held tightly to an atomically flat surface, were then imaged via contact-mode AFM in solution. The visually evident differences between branched versus unbranched molecules were clear.

Infrared spectroscopy. The infrared spectra of copolymers were determined by use of conventional IR spectrophotometers equipped with attenuated total reflectance. The spectra revealed the characteristic amide and imide peaks, thus indicating the presence or absence of succinimide residues, as well as aspartate, asparagine, and other residues. The spectra also revealed the presence of functional additive groups in derivatized copolymers.

Residue Ratios via Assessment of Titratable Groups of Polymer Products.

Quantitative acid-base titrations of the copolymers over the pH range of 7 to 2.5 were made manually by use of digital pipettors and also by use of an automated titrator. The procedure began with weighing a standard amount of material, typically 100 mg, into a beaker containing distilled water, typically 50 ml. The initial pH was measured and brought to pH 7 by addition of either 1N NaOH or 1N HCl (Fisher Scientific standard reagents and pH buffers). The titration was conducted by recording the volumes of titrant (1N HCl) versus pH from pH 7 to 2.5. The $\mu$moles of NaOH consumed over this range corresponded to the $\mu$moles of titratable groups in the original sample. Controls consisted of titrations of distilled water and standard compounds including reagent grade aspartic acid, purified sodium polyaspartates, purified polyaspartic acids, purified polysuccinimides, and purified polyasparagine (Sigma Chemical). The amount of acid or base that was consumed over this range indicated the amount of titratable groups of aspartic acid per unit weight of the copolymers.

The material was then back-titrated to pH 7 using 1N NaOH, as a comparison and check on the downward titration, then continued to pH 10.0. The solution was warmed to 60 to 65° C. to facilitate the mild, alkaline ring-opening of succinimide residues, if any. Amounts of 1N NaOH were added to maintain the pH at 10.0 until the downward pH drift that accompanies the ring-opening (as OH$^-$ molecules are consumed) ceased. This volume also was recorded as an indication of the amount of succinimide residues that had been converted to aspartate residues.

As a more quantitative measurement of the appearance of new aspartate residues in the solution, the downward pH titration was repeated. The pH was adjusted to pH 7 via additions of 1N HCl. The titration was then continued to pH 2.5, again recording the volume of titrant versus pH. The number of moles of succinimide residues in a particular polymer product was determined from the difference between the $\mu$moles of HCl needed to titrate from pH 7 to 2.5 after the ring-opening procedure, as compared to the original amount of $\mu$moles of HCl consumed from pH 7 to 2.5 by the fresh polymer material.

The number of micromoles of aspartate residues and succinimide residues was next converted to an amount in milligrams. The difference between the original amount of sample and the amount of aspartate and succinimide residues corresponded to the amount of nontitratable mass in the original sample. For the terpolymers of aspartate, asparagine, and succinimide, the mass of nontitratable materials is equivalent to the amount of asparagine residues. In cases in which extra mass of titrant or additives were present in the dried bulk polymer samples, appropriate corrections were made.

Amino acid analysis. The copolymers were hydrolyzed via acid treatment to produce the monomeric constituents. These were then treated to form their phenylthio carbamyl derivatives by use of phenylisothiocyanate. The derivatized amino acids were next separated via reverse-phase, liquid chromatography and identified by comparison to chromatograms of standards of the amino acids, also so treated. This method generated quantitative data of the amino-acid composition of the copolymers.

Soil flocculation assay. Soil was obtained from the US Department of Agriculture, Agriculture Research Service from a test site in Idaho. The flocculation assay involved suspension of a soil sample in distilled water in the presence or absence of the additives at different doses. The water contained divalent cations at 0.1 molar (calcium and/or magnesium), which has been shown as a significant variable to be controlled (e.g., Dontsova and Norton, 1999). Although a variety of arrangements are possible, routine measurements involved a soil sample of 25 mg placed in 10 ml of water in a 20 ml vial or test tube. A typical effective dose of additive was 10 $\mu$g/ml (ppm). The soil suspension was vortexed or otherwise mixed, and settling was followed by use of a spectrophotometer or other device for observing light dispersion, for example at 450 nM. Control systems contained either no additive or PAM. The PAM-treated soil suspensions start to settle noticeably within seconds, yielding clear supernatants in a minute or so, whereas the untreated controls remain turbid throughout the assay and sometimes considerably longer.

Examples 1–2

Preparation of Polysuccinimide Starting Materials

Example 1

Figure 3:
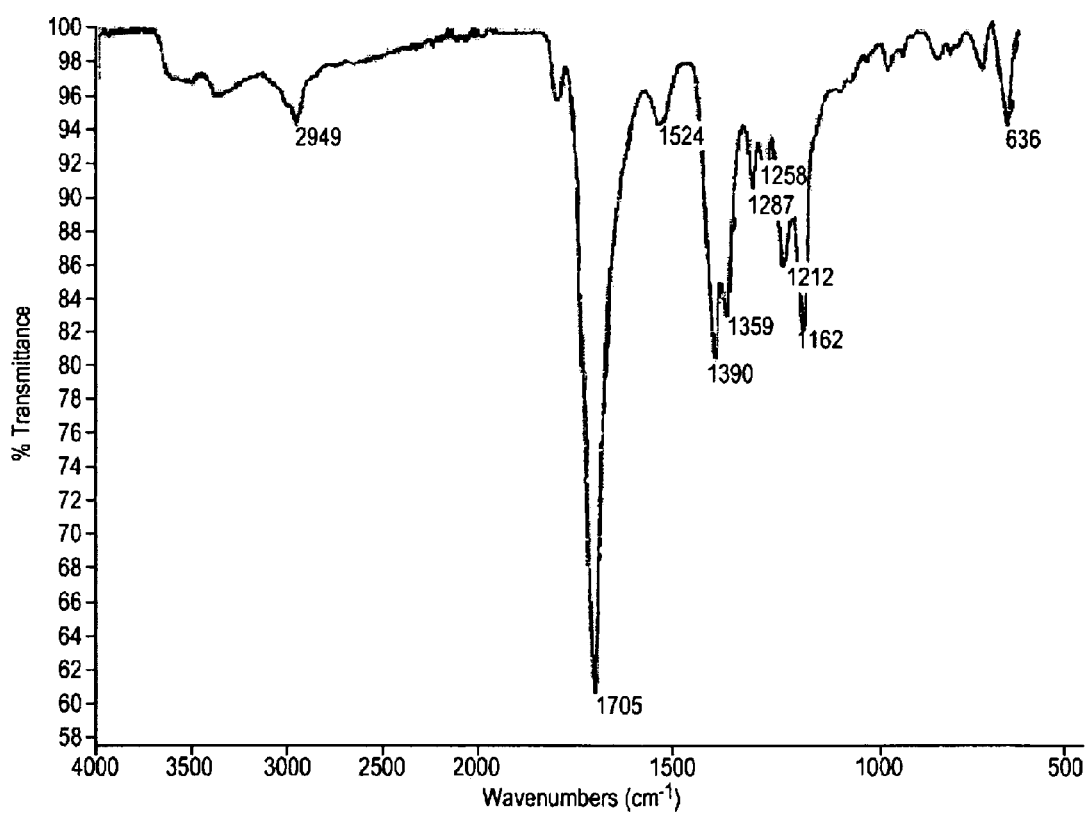
FIG. 3 is an infrared spectrum of the 5 kDa polysuccinimide of Example 1, showing a characteristic imide peak at 1705 $cm^{-1}$ and an amide signal at 1524 $cm^{-1}$, the latter being indicative of ring-opened residues as would occur at branch points.

Preparation of a Moderately Branched Polysuccinimide of Approximately 3 to 5 kDa Molecular Weight An amount of 0.1 mole of aspartic acid (13.3 g) in a 600 ml beaker was thermally polymerized in a vacuum oven at 220° C. for 4 hours. The resulting polysuccinimide, which was obtained in essentially quantitative yield of 9.7 g, had a molecular weight of 3 to 5 thousand Daltons (referred hereafter as 5 kDa), as shown by gel permeation (weight average). It was moderately branched as shown by titration of carboxylate groups, indicating a branch point at roughly 1 in 10 residues. The color of the solid product was light tan. The IR spectrum (FIG. 3) showed a characteristic imide peak at 1705 cm$^{-1}$ and an amide signal at 1524 cm$^{-1}$, indicative of ring-opened residues, as would occur at branch points. (2949 w, 1705 s, 1524 w, 1390 m, 1359 m, 1287 w, 1258 w, 1212 m, 1162 m)

Example 2

Preparation of an Unbranched Polysuccinimide of Approximately 30 kDa Molecular Weight Having Excellent Color A mixture of 0.1 mole of aspartic acid (13.3 g) and 4 g polyphosphoric acid (30% by weight of the aspartic acid) in a 600 ml beaker was heated at 120° C. with stirring, forming a homogeneous paste of the catalyst and aspartic acid. This mixture was then polymerized by heating in a vacuum oven at 190° C. for 4.5 hours.

The product was washed to remove the catalyst until the washings were pH neutral. The polysuccinimide product, obtained in nearly quantitative yield, was light cream in color, insoluble in water, and had a gel-permeation (weight average) molecular weight of approximately 30 kDa. The titration data for carboxylic groups indicated the presence of few branch points (less than 1 per 10 residues), as also shown by a lack of the amide peak at 1520 cm$^{-1}$ in the IR spectrum. (3622, 2946, 1704, 1390, 1369, 1297, 1258, 1210, 1159, 633 cm$^{-1}$)

Figure 4:
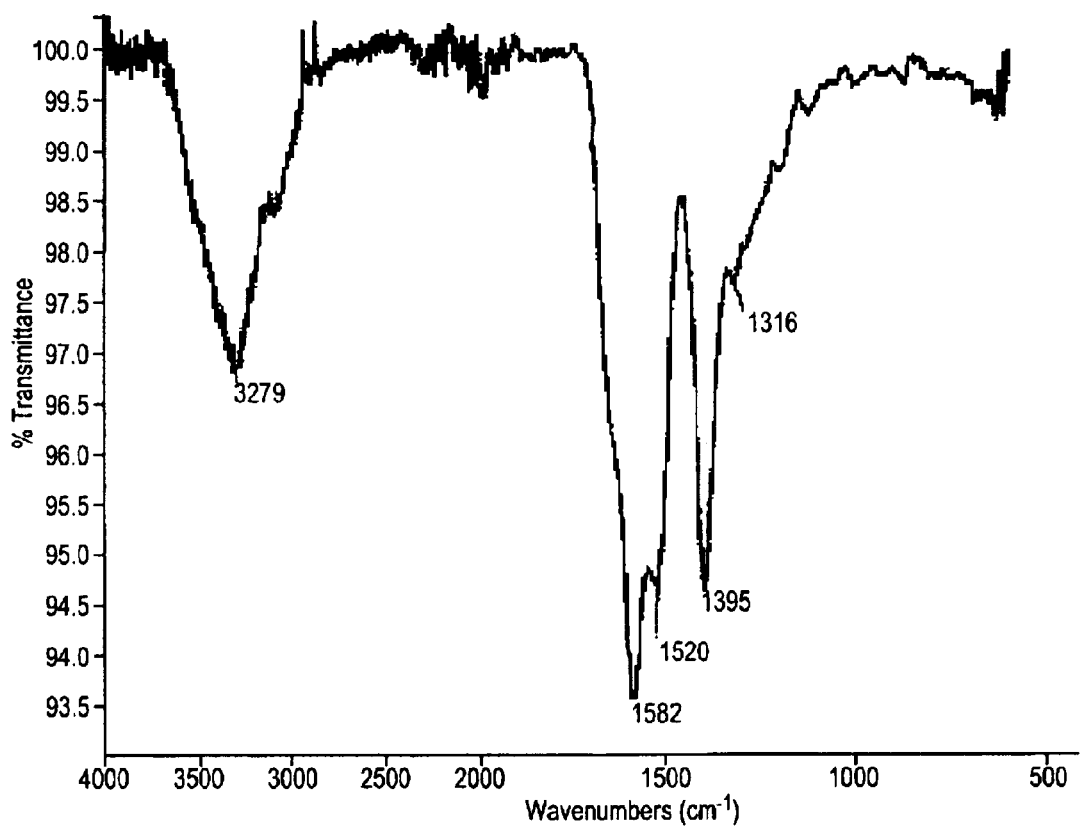
FIG. 4 is an infrared spectrum of sodium polyaspartate, prepared from the 30 kDa polysuccinimide of Example 2, showing a diagnostic amide doublet in the region of 1500–1600 $cm^{-1}$, and carboxylate signals, sharply at 1395 $cm^{-1}$ and broadly in the region of 3200 to 3300 $cm^{-1}$.

An infrared spectrum (FIG. 4) of sodium polyaspartate prepared from this polysuccinimide showed the diagnostic amide doublet in the region of 1500–1600 cm$^{-1}$, and carboxylate signals, sharply at 1395 cm$^{-1}$, and broadly in the region of 3200 to 3300 cm$^{-1}$. (3278 s, 1582 s, 1520 s, 1395 s, 1316 w)

Examples 3–6

Production of Copolymers of Sodium Aspartate, Asparagine and Succinimide by Ring-opening of Polysuccinimide Using an Equimolar Solution of Ammonium Hydroxide and Sodium Hydroxide, Followed by Restoration of the Imide Rings via Thermal Treatment Example 3 pH 8, 5 kDa Starting Material

Polysuccinimide prepared according to Example 1 (9.7 g, 0.1 residue-moles) was slurried in 100 ml of distilled water in a 250 ml beaker, and the mixture was heated at 80° C. with stirring. The slurry was manually titrated to pH 8 using a 1:1 molar solution of NH$_4$OH and NaOH (prepared from 3.14 ml conc. NH$_4$OH per 5 ml 10N NaOH, both reagent grade). At this pH, most of the aqueous ammonia is in the non-nucleophilic form of NH$_4^+$.

Stirring and heating were continued until the slurry of polysuccinimide was completely converted to a solution of mixed ammonium/sodium polyaspartate. The solution was heated to dryness at 120° C. overnight, then at 180° C. for 3 hours in a vacuum oven (to exclude oxygen and suppress color formation), at a pressure of 10 to 25 mm Hg. The product was shown to be composed of residues of sodium aspartate and asparagine, as indicated by the infrared spectrum and the titration data. It was a golden color and completely water soluble, with a pH=6.

To drive the formation of imide rings, the procedure was repeated, except that the ring-closure was run at 220° C. for periods up to 10 hours. This resulted in a copolymer of aspartate, asparagine, and succinimide. The product was water soluble (pH=4.79) and dark reddish in color.

Figure 6:
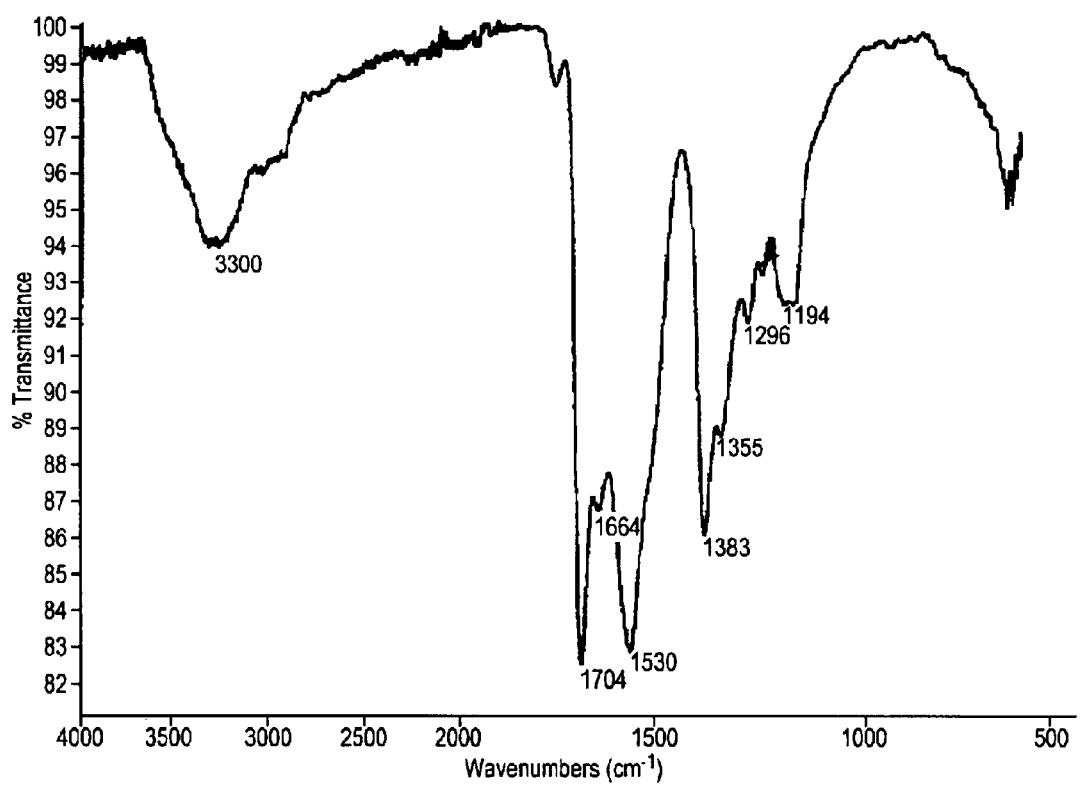
FIG. 6 is an infrared spectrum of an ammonium aspartate/sodium aspartate/asparagine copolymer, prepared as described in Example 3, after heating at 220° C. for 10 hours, showing a prominent imide signal at 1704 $cm^{-1}$.

The IR spectrum of the product obtained after heating at 180° C. for three hours showed the peaks associated with polymers of aspartate, e.g. at 1391 (carboxylate), 1533 and 1589 (primary amide doublet), and 3300 cm$^{-1}$ (carboxylate), as well as signals characteristic of asparagine residues, at 1648 cm$^{-1}$ and 3072 cm$^{-1}$ (side chain of the —CONH$_2$ R-group) (3300 s, 3072 m, 1648 s, 1589 s, 1533 s, 1391. s, 1196 w). After heating at 220° C. for 4.5 hours, the imide signal at 1704 cm$^{-1}$ began to emerge, as a result of ammonium aspartate residues being converted to succinimides (3292 s, 3057 w, 2933 w, 1704 sh, 1651 s, 1585 s, 1392 m, 1290 w, 1197 w). After heating at 220° C. for 10 hours, the imide signal at 1704 cm$^{-1}$. became prominent (FIG. 6) (3300 s, 1704 s, 1664 m, 1530 s, 1383 m, 1355 m, 1296 w, 1194 m).

Example 4 pH 9, 30 kDa Starting Material

The reaction conditions and procedures as described in Example 3 were followed, using the polysuccinimide prepared according to Example 2 as starting material. In addition, the drying step was accomplished via use of a forced-air oven set at 80° C. rather than a convection oven at 120° C., to avoid hydrolysis of the polymer chain during drying. Ring-closure was conducted at 220° C. for 4.5 hours.

The resulting product copolymer, in this case having Mw~30 kDa, minimally branched, and darkened in color relative to the starting material, was again shown to be composed of sodium aspartate, asparagine, and succinimide, as indicated by the infrared spectrum and the titration data.

Example 5 pH 10, 5 kDa Starting Material

The reaction conditions and procedures of Example 3 were followed, except that the pH of the alkaline ring-opening was set at 10. This leads to the dissociation of the ammonium ions, such that they present themselves as predominantly free, aqueous NH$_3$ molecules. In this case, the competition between the nucleophiles, NH$_3$ versus OH—, is enhanced in favor of ammonia, resulting in increased production of asparagine residues.

The ring-closure was run at 220° C. for 2 hours. The product copolymer was shown to be composed of sodium aspartate, asparagine, and succinimide. It was water soluble and dark in color, Mw~5 kDa, moderately branched.

Example 6 pH 10, 30 kDa Starting Material

The reaction conditions and procedures of Example 5 were followed except that the polysuccinimide of Example 2 and the drying conditions of Example 4 were used.

The product copolymer again was shown to be a terpolymer of sodium aspartate, asparagine, and succinimide. The product was dark in color and water soluble, Mw~30 kDa, minimally branched.

Examples 7–11 pH Adjustment Prior to Drying and Ring-closure

Production of a copolymer of sodium aspartate, asparagine, and succinimide by ring-opening of polysuccinimide using a co-solution of ammonium hydroxide and sodium hydroxide at 0.5:0.5 equivalents of each relative to the moles of succinimide residues, followed by downward adjustment of pH prior to drying and ring-closure.

A slurry of 313 g of the polysuccinimide of Example 2 (3.23 moles as succinimide residues, 97 g per mole) in 1.4 liter of distilled water in a 6 liter beaker was heated to 60–65° C. with stirring. A solution of $NH_4OH$ and NaOH, prepared by adding 101 ml of conc. $NH_4OH$ (Fisher Scientific, 15.9 M; 1.61 moles) to 161 ml of 10N NaOH (Fisher Scientific; 1.61 moles), was added manually by pipette to the polysuccinimide slurry, maintaining the pH at ~10. The reagent was added dropwise over 10 minutes, then rapidly over another 10 minutes, producing a solution having a final pH of 7.74.

The solution was diluted to 2 liters, and four 500 ml aliquots were treated with, respectively, HCl, $H_3PO_4$, $H_2SO_4$, or $HNO_3$, to obtain a designated pH value, prior to drying and ring-closure. Further subsamples of each of the pH-adjusted solutions were taken for ring-closure reactions at different temperatures for different intervals of time.

Examples 7–11 below described results for reaction mixtures treated with HCl to the indicated pH, followed by ring-closure at 180° C. for 3 hours under vacuum at 10 to 25 mm Hg. Each of these products was light golden in color. The Mw's of the product copolymers as measured by GPC correlated well with the Mw of the starting polysuccinimide.

Example 7

HCl Treatment, pH 5: Ring-closure at 180° C., 3 hours

Aliquots of 25 ml of the pH-adjusted solution were pipetted into 200-ml Pyrex dishes for drying overnight at 80° C. in a forced-air oven. These samples were then ring-closed at 180° C. for 3 hours in the vacuum oven. The resulting product terpolymer was shown by quantitative titration to have a residue ratio of 1:0.67:0.3 (asp:asn:suc). The IR spectrum featured a more apparent imide peak at 1706 $cm^{-1}$ than seen for the products of Examples 4 and 6. The asparagine side chain amides (R-group) signals were seen as a shoulder around 1600 $cm^{-1}$ and a peak at 3060 $cm^{-1}$. (3259, 3062, 1706, 1591, 1531, 1393, 1196, 635 $cm^{-1}$.)

Example 8

HCl Treatment, pH 4.5: Ring-closure at 180° C., 3 hours

Figure 7:
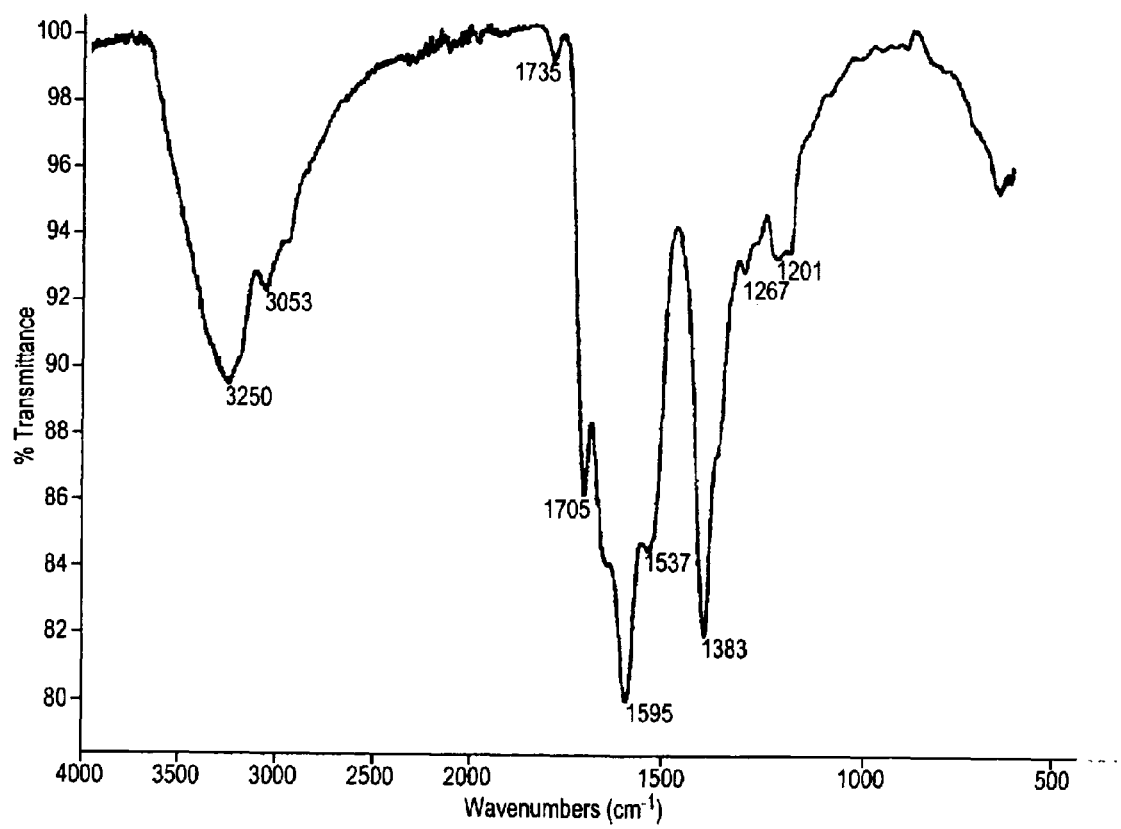
FIG. 7 is an infrared spectrum of the sodium aspartate/asparagine/succinimide terpolymer of Example 8, showing a defined imide peak at 1705 $cm^{-1}$ and the emergence of an asparagine side chain amide signal at 1650 $cm^{-1}$.

Aliquots of solution adjusted to pH 4.5 were treated as described in Example 7. The resulting product terpolymer had a residue ratio of 1:1:0.4 (asp:asn:suc). The IR spectrum (FIG. 7) showed a defined imide peak at 1705 $cm^{-1}$ and the emergence of an asparagine side chain amide signal at 1650 $cm^{-1}$. (3250 s, 3053 m, 1735 w, 1705. m, 1595 s, 1537 s, 1383 s, 1267 w, 1201 w)

Example 9

HCl Treatment, pH 4.0: Ring-closure at 180° C., 3 hours

Aliquots of solution adjusted to pH 4.0 were treated as described in Example 7. The resulting product terpolymer had a residue ratio of 0.75:1:0.63 (asp:asn:suc). In the IR spectrum, the imide peak at 1705 $cm^{-1}$ began to dominate, the side chain amide signal of asparagine at 1653 $cm^-$ became well defined, and the primary amide doublet (1598, 1540 $cm^{-1}$) was less pronounced, as more of the aspartate residues had been converted to succinimide residues. (3262 s, 3056 m, 1705 s, 1653 s, 1598 s, 1540 m, 1393 s, 1356 m, 1207 w, 1189 w)

Example 10

HCl Treatment, pH 3.5: Ring-closure at 180° C., 3. hours

Aliquots of solution adjusted to pH 3.5 were treated as described in Example 7. The resulting product terpolymer had a residue ratio of 0.43:0.69: 1 (asp:asn:suc). In the IR spectrum, the imide signal (1704 $cm^{-1}$). had begun to overshadow the other signals, although the secondary and primary amide signals of asparagine and aspartate were still evident.

Example 11

HCl Treatment, pH 3.0: Ring-closure at 180° C., 3 hours

Aliquots of solution adjusted to pH 3.5 were treated as described in Example 7. The product terpolymer having a residue ration of 0.21:0.80:1 (asp:asn:suc). The IR spectrum had begun to resemble the spectrum of polysuccinimide; however, secondary and primary amide signals remained visible.

The product copolymers in Examples 7–10 were completely water-soluble at neutral pH. The product of Example 11, the most enriched in succinimide residues, were only partially soluble at pH~7. All of the product copolymers began to precipitate at values below pH 3.0, increasingly so as the mole % of succinimide residues increased.

Similar results were obtained upon drying and heat treatment (ring closure) of solutions treated with the other three acids noted above.

Somewhat higher mole % of succinimide in the product copolymers were obtained by extending the heating time or increasing the temperature; however, this was typically accompanied by a darkening of the products. Darkening was mild in treatments up to 190° C. for up to 7 hours. However, at temperatures higher than this and for longer reaction times, the products often darkened noticeably.

Examples 12–17

Reactions Employing Ammonium Hydroxide (no metal hydroxide)

Example 12

Preparation of Copolymers of Ammonium Aspartate and Asparagine by Ring-opening of Polysuccinimide with 1 to 3 Equivalents (Per Equivalent of Succinimide Residues) Concentrated Ammonium Hydroxide (no Metal Hydroxide)

A sample of 0.97 g (10 residue-mmoles) of the polysuccinimide of Example 2 (Mw 30 kDa) was weighed into each of three 20-ml vials. To each of these was added 10 ml water. The initial pH=5.07 to 5.29.

Vial 1 (1 eq $NH_4OH$): Conc. $NH_4OH$ (14.8N, 0.676 mL; 10 mmol) were added, giving a pH of 11.26. The vial was firmly capped and the contents stirred magnetically. The polymer was fully dissolved in 2.5 hours at room temperature, and the solution had a pH of 8.85.

Vial 2 (2 eq NH$_4$OH): Conc. NH$_4$OH (14.8N, 1.35 mL; 20 mmol) were added, giving a pH of 11.40. The reaction was complete after stirring for 20 minutes at room temperature, producing a clear amber solution. The final pH=10.43.

Vial 3 (3 eq NH$_4$OH):. Conc. NH$_4$OH (14.8N, 2.03 mL; 30 mmol) were added, giving a pH of 11.74. There was complete dissolution of the polymer in 15. minutes at 23° C. The final pH =10.75.

The contents of the vials were poured into 200 ml Pyrex dishes and placed in a forced-air drying oven at 80° C. overnight. The yields were recorded as: vial 1, 1.224 g; vial 2, 1.228 g; vial 3, 1.227 g. A 1:1 copolymer of ammonium aspartate, asparagine has a residue Mw intermediate between those of ammonium aspartate (132) and asparagine (114); that is, an average residue. Mw of 123 Da. Correcting the original amount of polysuccinimide for the increased residue weight resulted in (123/97)(0.97g)=1.23 g as the theoretical yield for a 1:1 copolymer.

Comparison of the experimental yields with theoretical (1.23 g for a 1:1 copolymer of ammonium aspartate and asparagine) suggests that the product copolymers were approximately 50% asparagine. The titration data for these copolymers supported this indication, but with some increase in mole % as asparagine as the amount of ammonium hydroxide was increased. For the 1:1 succinimide:ammonium hydroxide treatment, the titration data showed 42% of the residues as asparagine: the 1:2 treatment, 51% as asparagine; the 1:3 treatment, 53% as asparagine.

Similar reactions using the polysuccinimides of Examples 1 and 2, at a ratio of succinimide:ammonium hydroxide of 1:2, yielded copolymers of ammonium aspartate and asparagine with up to 70% of residues as asparagine. The copolymers were water-soluble, forming clear to light yellow solutions of pH~6. There were, however, some noticeable differences in their aqueous properties. The higher Mw copolymer, however, began to form a white precipitate in the range of pH 4 to 5 upon titration, and continued to precipitate at lower values of pH, forming a sticky solid.

Figure 5:
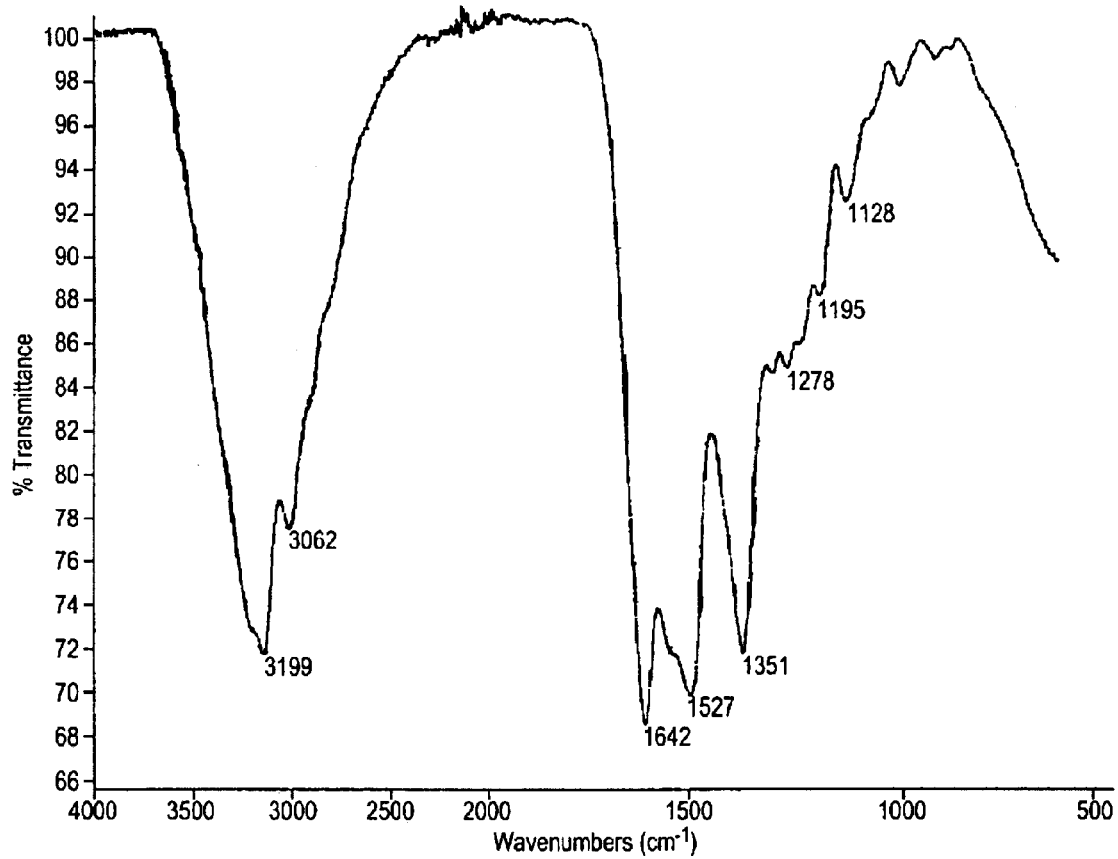
FIG. 5 is an infrared spectrum of a copolymer of ammonium aspartate and asparagine, as prepared in Example 12, using 2 mmols $NH_4OH$ per mmol succinimide residues in the starting material, showing characteristic asparagine signals at 1642 $cm^{-1}$ and 3062 $cm^{-1}$, corresponding to the amide linkage of the side chain R-group.

The IR spectrum (FIG. 5) of the copolymer prepared using the 1:2 treatment showed characteristic asparagine signals at 1642 cm$^{-1}$ and 3062 cm$^{-1}$, corresponding to the side chain amide linkage of the R-group. (3199 s, 3062 m, 1642 s, 1527 s, 1391. s, 1276 m, 1195w, 1126w)

Example 13

Preparation of a Terpolymer of Ammonium Aspartate, Asparagine, and Succinimide from an Intermediate Copolymer of Ammonium Aspartate and Asparagine A. Preparation of Intermediate Copolymer.

Samples of 16 g (0.165 mole succinimide residues) of the polysuccinimide of Example 1 (5 kDa) and Example 2 (30 kDa) were slurried in 110 ml H$_2$O in 500 ml poly bottles. To each of these were added 20 g (0.336 mole) of concentrated, reagent-grade ammonium hydroxide (14.8 M, 0.88. g/ml). The bottles were capped and the slurries swirled manually. Both samples fully dissolved within 6 minutes and warmed slightly.

The samples were poured into Pyrex dishes and dried at 80° C. overnight. The yield of the copolymer derived from the higher Mw polysuccinimide of Example 2 was 19.7 g, and the entire sample could be lifted easily from the drying dish, as a light amber glass. The other copolymer, derived from the lower Mw polysuccinimide, was much more adherent to the glass. The titration data for these ammonium aspartate/asparagine copolymers showed 61.4 mole % Asn for the 5 kDa material and 68.9 mole % Asn for the 30 kDa material.

B. Ring Closing

The samples were placed into the vacuum oven for ring-closure at 170° C. for 3 hours at 10–25. mm Hg. (Temperatures of 180° C. and above led to darkening of the products.) Yields were 16.8 g (30 kDa material) and 16.5 g (5 kDa material).

The titrations of the terpolymers showed residue ratios of ammonium aspartate: asparagine:succinimide of 0.22:1:0.29 for the 30 kDa material and 0.22:1:0.25 for the 5 kDa material.

The 30 kDa material was only partially soluble in water at pH 5.68; on upward titration, the material became fully dissolved at around pH 9.5. The 5 kDa terpolymer was fully soluble in water, forming a bright yellow solution at pH 4.9.

Examples 14–15 pH Adjustment Prior to Drying and Ring-closure of the Asparagine Enriched Copolymers of Example 13A

Example 14

A solution of 100 g of the 5 kDa ammonium aspartate/asparagine copolymer of Example 13A in distilled water (initial pH 6.39) was mechanically stirred, and 15 ml of concentrated HCl (12.1 N) was added, bringing the pH to 3.99. This solution was poured and rinsed into a large Pyrex dish for drying by forced-air at 80° C. for two days. The dish was then placed under vacuum at 180° C. for 3 hours. The product (87.2 g), which had not darkened noticeably, was strongly adherent to the glass, but could be scraped free. The titration data indicated a polymer with a residue ratio (asp:asn:suc) of 0.22:1:0.68.

Accordingly, the pH treatment increased the relative amount of succinimide residues relative to the products of Example 13B. In addition, the aspartic residues were present in the acid form. The material was slow to dissolve but formed a yellowish solution with pH=4.46. Adjusting the pH upwards made the polymer more readily soluble.

Example 15

The same procedure was followed as in Example 14, except that the original polysuccinimide was the 30 kDa polymer of Example 2.

Titration of the product indicated a terpolymer with residue ratio (aspartic acid: asparagine:succinimide) of 0.12:0.85:1. As such, the material was enriched in both asparagine and succinimide. The resulting terpolymer was not readily water soluble, producing a slight, partial, pale yellowish solution of pH 4.66. It could be rendered soluble only with warming, stirring, and mild alkaline treatment at pH 9 for 20 minutes.

Examples 16–17

Rendering the Asparagine- and Succinimide-enriched Terpolymers of Examples 14–15 More Water-soluble by Inclusion of Sodium Counterions A sample of 32.33 g of the polysuccinimide of Example 1 (5 kDa, 0.33 residue-mole of succinimide) was slurried in 215 ml distilled H$_2$O in a 500 ml poly bottle, and 40 g (0.67 mole) of conc. NH$_4$OH (14.8 M, 0.88 g/ml) was added. The polymer dissolved completely in approximately 6 minutes, giving a solution of pH 10.45.

The solution was transferred to a large Pyrex dish and dried for 2 days via forced-air at 80° C. Titration of the resulting ammonium aspartate/asparagine copolymer indicated 54 mole % asparagine.

The material redissolved in 200 ml water to give a solution with pH 5.69. The solution was titrated to pH=4.48 with 2.4 ml of 12.1N HCl. To this solution was then added 4.78 g of NaCl (0.0825 mol, equivalent to 25% of the original succinimide residues).

The solution was poured into the Pyrex dish and dried overnight at 80° C. It was next placed in the vacuum oven and the material ring-closed at 170° C. for 3 h at 10–25 mm Hg. The yield of the product terpolymer was 38.7 g. The material was readily removed from the Pyrex surface. Titration data indicated a residue ratio (NaAsp:Asn:Suc) of 0.375:1:0.438 (equivalent to a residue-mole % ratio of 20.7%:55.2%:24.1). (Because the yield was very close to theoretical, based on this residue ratio, it is believed that much of the HCl and NaCl added during reaction sublimated during the heating steps as the ammonium chloride salt.)

The material had a warm gold color, matching closely the color of the starting polymer after the ring-opening. It was largely water-soluble and generated a solution pH of 4.9 to 5.0. On downward pH titration, it formed a cream-colored precipitate; with adjustment to pH 7, it was completely soluble.

Example 17

The reactions and procedures of Example 16 were followed, generating a terpolymer of sodium aspartate, asparagine, and succinimide. In this case, the pH of the solution of the copolymer of ammonium aspartate and asparagine was adjusted downward to pH 4.0. prior to drying and ring-closure.

The terpolymer was similar to the product of Example 16, except that there were proportionally more succinimide residues. The residue ratio was 0.31:1:0.54 (NaAsp:Asn:Suc).

Example 18

Sodium Aspartate/Succinimide Copolymer Starting Material

A. Preparation of Sodium Aspartate/Succinimide Copolymer

Copolymers of sodium aspartate and succinimide were formed according to the methods of Sikes and coworkers (U.S. Pat. Nos. 5,981,691 and 6,495,658). These copolymers tend to be oligomeric, in the range of 10 residues (Mw around 1200), based on GPC measurements.

A sample of 13.3 g (100 mmol) of aspartic acid was slurried in 100 ml distilled water with stirring, and the aspartic acid was partially neutralized with 5 ml of 10 N NaOH (50 mmol). Conc. $NH_4OH$ (3.38 ml, 14.8 N, 50 mmol) was pipetted into the beaker, fully neutralizing and solubilizing the aspartic acid. The beaker was placed in a drying oven at 120° C. overnight, producing a clear, slightly yellowish glass of the comonomers, aspartic acid (plus residual ammonium aspartate) and sodium aspartate. The beaker was then heated in a vacuum oven at 200° C., 25 mm Hg, for 4 hours, to convert the material to a copolymer of sodium aspartate and succinimide. Titration data confirmed the 1:1 residue ratio.

B. Preparation of Aspartate:Asparagine:Succinimide Terpolymer

A sample of 1.175 g of the 1:1 copolymer of sodium aspartate and succinimide (eq. to 5 mmol imide residues) was dissolved in 10 ml of distilled water to give a solution having pH=5.61. To this solution was added 1 ml of conc. $NH_4OH$ (14.8M; 15 mmol). The vial was sealed and the solution stirred for 15 minutes, after which time the pH was measured at 10.84. The contents were poured into a 200-ml Pyrex dish and placed in an oven at 80° C., forced air, for drying overnight. This treatment removed extraneous ammonia.

The material was resolubilized in 10 ml of distilled water, transferred and rinsed into a 20 ml vial. The pH (6.18) was adjusted to 4.0 by addition of 0.36. ml of concentrated HCl (12.1N). The solution was then poured and rinsed into a 200 ml Pyrex dish for forced-air drying at 80° C. overnight. The dish was then heated in a vacuum oven at 180° C. at 25 mm Hg for 3 hours.

The product (1.288 g) was shown by titration data to be a terpolymer of sodium aspartate, asparagine, and succinimide in a residue ratio of 0.56:0.94:1 (asp:asn:suc). The terpolymer was water-soluble.

The reactions and procedures of this Example were repeated, except that the monomer ratios of ammonium aspartate and sodium aspartate were adjusted (in part A) to produce a 1:2 copolymer of sodium aspartate and succinimide. A solution of this copolymer was titrated to pH 4.0 and ring-closed as above. The resulting terpolymer of sodium aspartate, asparagine, and succinimide had a residue ratio of 0.53:1:0.97 (asp:asn:suc). This terpolymer also was water-soluble.

Example 19

Sodium Polyaspartate Starting Material

Several sodium aspartate polymers were converted into sodium aspartate:succinimide copolymers by downward titration of their solutions into the range of pH 3–5, drying, and ring-closure, in accordance with the general procedures described above.

In another variation (Example 19), a solution of sodium polyaspartate (produced by mild alkaline ring opening of a 30 kDa polysuccinimide, which was in turn produced by thermal treatment of aspartic acid according to Example 2) was placed in a dialysis bag having a Mw cutoff of 3 kDa and dialyzed against large volumetric excesses of 0.1 N HCl (2–3 liters with 2 changes), to convert the sodium polyaspartate to polyaspartic acid and remove the sodium counterions. The solution was then dialyzed two further times against 0.01 N HCl to remove excess HCl, and the dialysate, containing the polyaspartic acid, was lyophilized, removing residual HCl and producing fine, powdery flakes of a aspartic acid/succinimide copolymer. FIG. 8 is an infrared spectrum of the product copolymer, having a clear imide signal at 1720 $cm^{-1}$. Absorbances of the non-dissociated carboxylic acid groups (COOH) are shifted upward somewhat from those arising from carboxylate groups (e.g. FIG. 3). (3313 s, 3078 m, 2944 m, 1720 s, 1645 s, 1526 s, 1407 m, 1185 s)

Examples 20–23

Starch-grafted Terpolymers of Aspartate, Asparagine, and Succinimide; Assays for Activity as Soil Flocculants

Example 20

Graft of a Terpolymer of Sodium Aspartate, Asparagine, and Succinimide to Corn Starch by Nucleophilic Addition in Water A 0.1% by weight suspension of commercial corn starch (Safeway) in water was prepared, using 100 mg corn starch in 10 ml water. at 162 mg per residue mmole of glucose, this represents 0.617 mmol of glucose. A sample of 215 mg of a terpolymer of sodium aspartate, asparagine, and succinimide, prepared as described herein (approx. 1:1:1 molar ratio; approx. 0.6 mmol succinimide residues) was added with stirring, rendering the solution phase an amber color as it dissolved. The pH of the starch-terpolymer suspension-solution was adjusted and maintained at pH 11. by addition of 80 µl of 10 N NaOH.

The relative absence of a downward pH shift during the course of the reaction served as an indication of nucleophilic addition, as compared to the alkaline ring-opening reaction of succinimide, which consumes hydroxide ions. The product, presumed to be a grafted starch-terpolymer composition, was composed of gel-like flakes, unlike a similarly treated starch control (slurried and subjected to pH 11 plus heat), which remained a granular white slurry on cooling. It is expected that some crosslinking of the starch by the terpolymer took place, tending to convert the starch to a gel-like material having a polyanionic nature. Accordingly, the terpolymers of the present invention can be used as crosslinking agents and functionalizing agents (in this case, to solubilize some of the starch molecules and render them anionic while crosslinking others and imparting water absorbancy).

Example 21

Graft of a 5 kDa Terpolymer of Sodium Aspartate, Asparagine, and Succinimide to Potato Starch by Nucleophilic Addition in Water Potato starch has a high percentage of amylose chains, which linear, unbranched polymers of glucose in the 800 kDa and above Mw range, in contrast to corn starch, which is predominantly composed of high Mw (well into the millions of kDa) amylopectin chains, which are significantly branched and difficult to solubilize. Accordingly, grafts of potato starch were expected to be more water soluble than the corn starch grafts of Example 20.

Samples of 50 mg potato starch (KMC, Denmark) were placed in 10 ml water in 20 ml vials, and warmed to 80° C. with magnetic stirring. This corresponded to 0.3085 mmol glucose residues (50 mg/162 mg per mmole glucose residues). The potato starch formed clear, stirrable, colloidal suspensions.

Samples of 25, 50, 75, and 100 mg of the terpolymer of Example 16, residue ratio of 0.375:1:0.438 (Asp:Asn:Suc, equivalent to 180:450:210 µmoles/100 mg) were each dissolved in 7 ml of water, adjusting pH with alkali if necessary. Each was then pipetted into one of the above potato starch colloidal suspensions. The pH of each reaction was immediately adjusted to pH 11.5 by addition of 10N NaOH. In each treatment, the pH remained steady through the course of the reactions. After 30 minutes of stirring, the pH was adjusted 7 by addition of 1 N HCl, the vials were capped, and the samples were allowed to cool to room temperature.

Soil flocculation assays were run using these solutions, at levels of 5, 10, 20, and 50 ppm (µg/ml) of the starch-grafted materials. In these assays, light scattering of a standard soil suspension is observed over time. Flocculants reduce the time for the suspension to clarify, while dispersants increase the time to clarification.

Each of the samples exhibited flocculation activity at all concentrations, as compared to control treatments without polymer additives and treatments in which dispersants were added. Activity increased significantly on going from 5 ppm to 10 ppm and marginally thereafter. On comparing different terpolymer-starch grafts, the most effective ratio of starch:terpolymer for this material was found to be 1:1 by weight.

Example 22

Graft of a 30 kDa Terpolymer of Sodium Aspartate, Asparagine, and Succinimide to Potato Starch by Nucleophilic Addition in Water A sample of 50 mg of KMC potato starch (0.3085 mmol of glucose residues) was weighed into a 20 ml vial, 10 ml water was added, and the vial warmed to 80° C., with stirring. To this was added, with stirring, a solution of 50 mg of a terpolymer of ammonium aspartate, asparagine, and succinimide (Example 13) in water. The pH was adjusted to 11.47 with 10 N. NaOH, and remained steady through the course of the reaction. After 15 minutes, the vial was removed from the hotplate and allowed to cool for 15 more minutes. The contents of the vial had been converted to a light amber solution containing a small residue of light flocs of material. The solution was neutralized to pH=7.25 with 1.5 ml 1 N HCl.

Soil flocculation assays were run at 10 and 20 µg/ml (10, 20 ppm). The starch grafted material was active as a flocculent, with higher activity at 20 ppm; however, it was less effective than the product of Example 21, which employed a lower Mw terpolymer.

Example 23

Graft of a Low Mw Terpolymer of Sodium Aspartate, Asparagine, and Succinimide to Potato Starch by Nucleophilic Addition in Water A sample of 100 mg potato starch (KMC) was reacted with 100 mg of the terpolymer of Example 18, having a residue ratio of 0.53:1:0.97 (asp:asn:suc) and a Mw of about 1200 Da), essentially according to the procedure of Example 22. This material had higher activity in soil flocculation assays (measured at 10 and 20 ppm) than the materials of Examples 21. and 22, formed from higher Mw terpolymers.

What is claimed is:

1. An aspartate copolymer comprising (a) aspartate residues, which may be substituted at the side chain carboxyl, and at least one type of residue selected from (b) asparagine residues, which may be substituted at the side chain nitrogen, and (c) succinimide residues, and characterized by
  (i) a molecular weight greater than 5000 Daltons, or
  (ii) a substantially linear morphology and a molecular weight greater than 600 Daltons, or
  (iii) water solubility and a molecular weight greater than 2000 Daltons, or any combination thereof.

2. The copolymer of claim 1, characterized by
  (i) a molecular weight of about 5000 to about 100,000 Daltons, or
  (ii) a substantially linear morphology and a molecular weight of about 600 to about 100,000 Daltons, or
  (iii) water solubility and a molecular weight of about 2000 to about 100,000 Daltons, or any combination thereof.

3. The copolymer of claim 1, characterized by water solubility and a molecular weight of about 5000 to about 100,000 Daltons.

4. The copolymer of claim 3, having a substantially linear morphology.

5. The copolymer of claim 1, wherein said asparagine residues are unsubstituted.

6. The copolymer of claim 1, wherein said aspartate residues are unsubstituted.

7. The copolymer of claim 6, wherein said aspartate residues have a metal counterion.

8. The copolymer of claim 1, having a linear morphology and a molecular weight of about 5000 to about 100,000 Daltons.

9. The copolymer of claim 8, having a linear morphology and a molecular weight of about 30,000 to about 100,000 Daltons.

10. The copolymer of claim 1, having a branched morphology and a molecular weight of about 5000 to about 100,000 Daltons.

11. The copolymer of claim 10, having a branched morphology and a molecular weight of about 30,000 to about 100,000 Daltons.

12. A method of synthesizing an aspartate copolymer, the method comprising:
  (a) adding to an aqueous slurry of a polysuccinimide, at a pH of about 8–12, a reagent selected from (i) ammonium hydroxide and (ii) a mixture of ammonium hydroxide and a metal hydroxide, effective to produce a product copolymer containing aspartate and asparagine residues; and
  (b) drying said copolymer under non-hydrolytic conditions.

13. The method of claim 12, wherein said product copolymer contains ammonium aspartate residues, and said drying is effective to convert at least a portion of said ammonium aspartate residues to aspartic acid residues.

14. The method of claim 13, further comprising the step of
  (c) heating said copolymer, effective to convert at least a portion of said aspartic acid residues to succinimide residues.

15. The method of claim 12, wherein said metal hydroxide is sodium hydroxide.

16. The method of claim 12, wherein said non-hydrolytic conditions comprise a temperature less than about 90° C.

17. The method of claim 14, wherein said heating is at about 180–350° C.

18. The method of claim 12, wherein said reagent is (i) ammonium hydroxide.

19. The method of claim 12, further comprising, prior to said drying step (b), adjusting the pH of a solution of said copolymer to about 2–6.

20. The method of claim 19, further comprising, following said adjusting, adding an alkali metal salt to said solution, in a molar amount which is less than the molar amount of succinimide residues in said polysuccinimide.

21. The method of claim 20, wherein said salt is a sodium salt, and said molar amount of salt is about 25–50% of the molar amount of succinimide residues in said polysuccinimide.

22. The method of claim 14, further comprising derivatizing said copolymer by reaction of one or more derivatizing reagents at succinimide carbonyl groups, asparagine amide side groups, aspartate carboxyl side groups, or a combination thereof.

23. The method of claim 22, wherein said derivatizing is carried out in an aqueous environment.

24. The method of claim 22, wherein said derivatizing comprises reacting said copolymer with a polymeric hydroxyl-containing compound.

25. A conjugate of an aspartate copolymer with a polymeric hydroxyl-containing compound, wherein said aspartate copolymer comprises (a) aspartate residues and at least one type of residue selected from (b) asparagine residues and (c) succinimide residues, and is characterized by
  (i) a molecular weight greater than 5000 Daltons, or
  (ii) a substantially linear morphology and a molecular weight greater than 600 Daltons, or
  (iii) water solubility and a molecular weight greater than 2000 Daltons, or any combination thereof.

26. The conjugate of claim 25, wherein at least one said polymeric hydroxyl-containing compound is conjugated to the backbone of said aspartate copolymer via a side chain ester linkage.

27. The conjugate of claim 25, which is further characterized by activity as a flocculating agent.

28. A method of preparing a copolymer having aspartic acid and succinimide residues, comprising
  treating a solution of a polyaspartate polymer having a cationic non-hydrogen counterion to replace the counterion with hydrogen, by dialysis or ion exchange, and lyophilizing the resulting solution.

29. The method of claim 28, wherein said polyaspartate polymer is sodium polyaspartate.

* * * * *